US012690058B2

(12) United States Patent     (10) Patent No.:   US 12,690,058 B2

Gao et al.             (45) Date of Patent:      Jul. 21, 2026

(54) SIGNAL SENDING METHOD AND APPARATUS

(71) Applicant: HUAWEI TECHNOLOGIES CO., LTD., Shenzhen (CN)

(72) Inventors: Xinyu Gao, Beijing (CN); Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 741 days.

(21) Appl. No.: 17/881,851

(22) Filed: Aug. 5, 2022

(65) Prior Publication Data

US 2022/0394723 A1     Dec. 8, 2022

Related U.S. Application Data

(63) Continuation of application No. PCT/CN2020/074563, filed on Feb. 7, 2020.

(51) Int. Cl.
*H04L 27/26*       (2006.01)
*H04B 7/024*       (2017.01)
(Continued)

(52) U.S. Cl.
CPC ........ *H04W 72/542* (2023.01); *H04B 7/0626* (2013.01); *H04B 7/0634* (2013.01); *H04W 72/0453* (2013.01)

(58) Field of Classification Search
CPC ... H04L 5/0051; H04L 5/0057; H04L 5/0023; H04L 5/0094; H04W 76/28;
(Continued)

(56) References Cited

U.S. PATENT DOCUMENTS

| | | | | |
|---|---|---|---|---|
| 12,003,298 | B2 * | 6/2024 | Wei | H04B 7/0645 |
| 2009/0121936 | A1 * | 5/2009 | Maltsev | H01Q 3/2605 |
| | | | | 342/373 |

(Continued)

FOREIGN PATENT DOCUMENTS

| | | |
|---|---|---|
| CN | 109474322 A | 3/2019 |
| CN | 109845205 A | 6/2019 |

(Continued)

OTHER PUBLICATIONS

ZTE, "CSI Enhancement for MU-MIMO Support", 3GPP TSG RAN WG1 Meeting #95, R1-1813913, Nov. 16, 2018, total 11 pages.

(Continued)

*Primary Examiner* — Marcus Smith
*Assistant Examiner* — Jason A Harley

(57)          ABSTRACT

A signal sending method and a related apparatus are disclosed. In the signal sending method, an access network device obtains a channel information sample, determines M' frequency domain units in M frequency domain units in an $(x+T)^{th}$ time unit based on the channel information sample, and sends one or more measurement pilots to a terminal in the M' frequency domain units. The one or more measurement pilots are used to measure CSI, and the channel information sample includes channel information in an $x^{th}$ time unit to an $(x+T-1)^{th}$ time unit, where M'<M. In the method, the access network device may determine the M' frequency domain units in the M frequency domain units in the $(x+T)^{th}$ time unit to send the one or more measurement pilots, to implement frequency-domain dimension reduction of the one or more measurement pilots.

20 Claims, 12 Drawing Sheets

(51) Int. Cl.

| | | |
|---|---|---|
| *H04B 7/06* | (2006.01) | |
| *H04B 17/318* | (2015.01) | |
| *H04L 5/00* | (2006.01) | |
| *H04W 72/04* | (2023.01) | |
| *H04W 72/0453* | (2023.01) | |
| *H04W 72/12* | (2023.01) | |
| *H04W 72/542* | (2023.01) | |
| *H04W 72/563* | (2023.01) | |

(58) Field of Classification Search
    CPC .. H04W 72/23; H04W 72/044; H04B 7/0626;
    H04B 17/309
    USPC ................................................. 370/330, 317
    See application file for complete search history.

(56) References Cited

U.S. PATENT DOCUMENTS

| | | | |
|---|---|---|---|
| 2013/0258964 A1 | 10/2013 | Nam et al. | |
| 2016/0029238 A1* | 1/2016 | Chen .................... | H04W 76/27 |
| | | | 370/252 |
| 2016/0241981 A1* | 8/2016 | Law ..................... | G10L 19/008 |
| 2018/0123671 A1* | 5/2018 | Wu ..................... | H04L 25/0224 |
| 2018/0212663 A1* | 7/2018 | Liu ..................... | H04B 7/0626 |
| 2018/0302140 A1 | 10/2018 | Rahman et al. | |
| 2019/0363760 A1* | 11/2019 | Wu ..................... | H04B 7/0478 |
| 2021/0136827 A1* | 5/2021 | Xiong ................. | H04W 74/006 |
| 2022/0224568 A1* | 7/2022 | Jin ..................... | H04B 17/364 |
| 2024/0187063 A1* | 6/2024 | Jeon ................... | H04B 7/0626 |

FOREIGN PATENT DOCUMENTS

| | | |
|---|---|---|
| CN | 110535513 A | 12/2019 |
| WO | 2016161919 A1 | 10/2016 |

OTHER PUBLICATIONS

Huawei et al., "Discussion on CSI enhancement for MU-MIMO", 3GPP TSG RAN WG1 Meeting #94bis, R1-1810103, Oct. 12, 2018, total 10 pages.

R1-1908065, Huawei, HiSilicon, Discussion on CSI enhancement, Prague, Czech Republic, Aug. 26-30, 2019. total 14 pages.

International Search Report and Written Opinion issued in PCT/CN2020/074563, dated Oct. 27, 2020, 9 pages.

ZTE: "CSI Enhancement for MU-MIMO Support", 3GPP Draft; R1-1813913,Nov. 13, 2018, pp. 1-11, XP051480110.

Rahman MD Saifur et al: "CSI feedback based on space-frequency compression", Jan. 10, 2020, pp. 1-6, XP033745340.

Extended European Search Report issued in EP20917665.0, dated Dec. 19, 2022, 10 pages.

* cited by examiner

Access
network device

Terminal

☐ Data          ▨ CSI-RS

A quantity of
antenna ports
increases

Frequency

Time

Frequency

Time

☐ One element in a matrix

Feedback coefficient = Space-domain compression matrix × Downlink space-frequency two-dimensional channel matrix × Frequency-domain compression matrix Access network device Dimension-reduced measurement pilot Feedback information Terminal Access network device Terminal

RB 1         RB 2         RB M

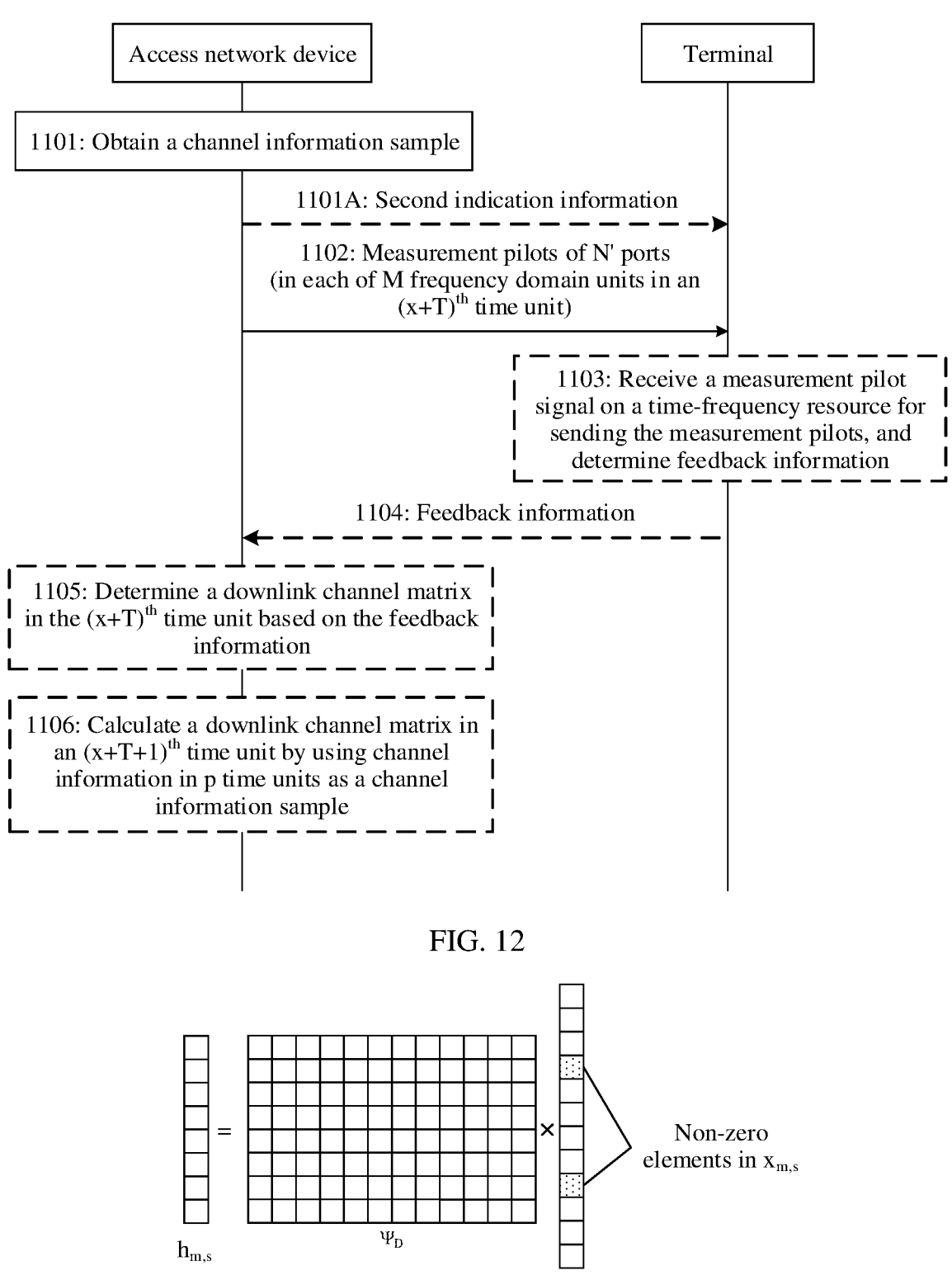

Access network device

Terminal

1101: Obtain a channel information sample

1101A: Second indication information

1102: Measurement pilots of N' ports (in each of M frequency domain units in an $(x+T)^{th}$ time unit)

1103: Receive a measurement pilot signal on a time-frequency resource for sending the measurement pilots, and determine feedback information 1104: Feedback information 1105: Determine a downlink channel matrix in the $(x+T)^{th}$ time unit based on the feedback information 1106: Calculate a downlink channel matrix in an $(x+T+1)^{th}$ time unit by using channel information in p time units as a channel information sample

FIG. 12

Non-zero elements in $x_{m,s}$ $h_{m,s}$  $\Psi_D$  $x_{m,s}$

FIG. 13

SIGNAL SENDING METHOD AND APPARATUS

CROSS-REFERENCE TO RELATED APPLICATIONS

This application is a continuation of International Application No. PCT/CN2020/074563, filed on Feb. 7, 2020, the disclosure of which is hereby incorporated by reference in its entirety.

TECHNICAL FIELD

This application relates to the field of communication technologies, and in particular, to a signal sending method and apparatus.

BACKGROUND

In a massive multiple input multiple output (MIMO) technology, which has been listed as one of $5^{th}$ generation (5G) mobile communication new radio (NR) core technologies, dozens of or even more than one hundred antenna ports (referred to as ports for short below) are configured on an access network device, so that a spatial degree of freedom can be greatly improved, and spectral efficiency and a transmission rate can be significantly increased.

To fully exploit the foregoing potential of the massive MIMO, a channel matrix of a space-frequency two-dimensional channel needs to be accurately obtained. Normally, using frequency division duplex (FDD) massive MIMO as an example, as shown in FIG. 1, a process of obtaining a downlink space-frequency two-dimensional channel matrix is as follows: An access network device sends a plurality of channel state information-reference signals (CSI-RSs) to a terminal by using a plurality of resource elements (REs). The terminal receives the CSI-RSs, estimates the downlink space-frequency two-dimensional channel matrix based on the CSI-RSs, determines channel state information (CSI) of a downlink channel based on the downlink space-frequency two-dimensional channel matrix, quantizes the CSI, and feeds back the quantized CSI to the access network device through an uplink channel.

It should be noted that both CSI-RS overheads for estimating the downlink space-frequency two-dimensional channel matrix and overheads for uplink feedback are directly proportional to a quantity of ports of the access network device and a considered quantity of resource blocks (RBs). As shown in FIG. 2, for example, as a quantity of ports increases, CSI-RS overheads for estimating a downlink space-frequency two-dimensional channel matrix also increase. However, in a massive MIMO system, an access network device usually has a large quantity of ports. In addition, to implement RB-level precoding with higher spectral efficiency in the future, the considered quantity of RBs is usually large. Therefore, obtaining the downlink space-frequency two-dimensional channel matrix causes huge time-frequency resource overheads.

To reduce overheads for estimating the downlink space-frequency two-dimensional channel matrix, a solution to compressing and feeding back a downlink space-frequency two-dimensional channel matrix is proposed in 3rd generation partnership project (3GPP) Release 16 (R16), to reduce the overheads for the uplink feedback. In this solution, an access network device first sends a plurality of CSI-RSs to a terminal through a plurality of different (namely, orthogonal) REs, and the terminal estimates a downlink space-frequency two-dimensional channel matrix based on the received CSI-RSs. Then, the terminal performs space-frequency two-dimensional compression on the downlink space-frequency two-dimensional channel matrix, and feeds back the compressed downlink space-frequency two-dimensional channel matrix to the access network device, to feed back a plurality of elements with top amplitudes in the downlink space-frequency two-dimensional channel matrix and locations of the corresponding elements to the access network device. As shown in FIG. 3, an N*M downlink space-frequency two-dimensional channel matrix is multiplied by a space-domain compression matrix with N columns and a frequency-domain compression matrix with M rows, so that the downlink space-frequency two-dimensional channel matrix is compressed into a matrix (denoted as a feedback coefficient, which may also be referred to as a feedback matrix) whose rows and columns are fewer than the downlink space-frequency two-dimensional channel matrix, and the feedback coefficient is fed back to the access network device. In the space domain, a channel is projected to a plurality of oversampled discrete Fourier transform (DFT) beams, a plurality of beams with top projection coefficients are selected, and sequence numbers of the plurality of beams and the projection coefficients corresponding to the plurality of beams are fed back to the access network device. In the frequency domain, the channel is projected to DFT beams (delay taps), several taps with top power are selected, and locations of the taps and projection coefficients corresponding to the taps are fed back to the access network device. The access network device recovers the downlink space-frequency two-dimensional channel matrix based on the received locations of the plurality of beams, projection coefficients corresponding to the plurality of beams, locations of the taps, and projection coefficients corresponding to the taps.

Although the foregoing solution can reduce the overheads for the uplink feedback, the terminal needs to first estimate the complete downlink space-frequency two-dimensional channel matrix by measuring the CSI-RSs, then perform space-frequency two-dimensional compression on the downlink space-frequency two-dimensional channel matrix, and feed back the compressed downlink space-frequency two-dimensional channel matrix to the access network device. Consequently, the CSI-RS overheads (which may also be referred to as downlink CSI-RS overheads) for estimating the downlink space-frequency two-dimensional channel matrix cannot be reduced.

SUMMARY

This application provides a signal sending method and apparatus, to reduce CSI-RS overheads for estimating a downlink space-frequency two-dimensional channel matrix.

To achieve the objective, this application provides the following technical solutions.

According to a first aspect, a signal sending method is provided, including: An access network device obtains a channel information sample, where the channel information sample includes channel information in an $x^{th}$ time unit to an $(x+T-1)^{th}$ time unit, and both x and T are integers greater than or equal to 1. The access network device determines M' frequency domain units in M frequency domain units in an $(x+T)^{th}$ time unit based on the channel information sample, where the M' frequency domain units are used to send one or more measurement pilots, the one or more measurement pilots are used to measure channel state information (CSI), both M' and M are integers greater than or equal to 1, and M'<M. The access network device sends the one or more measurement pilots to a terminal in the M' frequency domain units. According to the method provided in the first aspect, the access network device may determine the M' frequency domain units in the M frequency domain units in the $(x+T)^{th}$ time unit to send the one or more measurement pilots, to implement frequency-domain dimension reduction of the one or more measurement pilots. Compared with a conventional technology in which one or more measurement pilots are sent in M frequency domain units, the method can reduce a quantity of frequency domain units for sending the one or more measurement pilots, and reduce overheads for sending the one or more measurement pilots, so that measurement pilot overheads for estimating a downlink channel matrix are reduced.

In a possible implementation, the method further includes: The access network device sends first indication information to the terminal, where the first indication information indicates location information of the M' frequency domain units. In this possible implementation, the terminal can determine the frequency domain units for receiving the one or more measurement pilots.

In a possible implementation, that the access network device sends the one or more measurement pilots to a terminal in the M' frequency domain units includes: The access network device sends measurement pilots of N' ports to the terminal in each of the M' frequency domain units based on the channel information sample, and sends second indication information to the terminal, where the second indication information indicates a value of N', and N' is an integer greater than or equal to 1. In this possible implementation, the terminal can determine a quantity of ports for sending the one or more measurement pilots.

In a possible implementation, the method further includes: The access network device receives feedback information from the terminal, where the feedback information indicates information about a measurement pilot signal received by the terminal in the $(x+T)^{th}$ time unit. The access network device determines a downlink channel matrix in the $(x+T)^{th}$ time unit based on the feedback information. In this possible implementation, after measuring the one or more measurement pilots, the terminal does not perform channel estimation or compression and feedback, but directly feeds back, to the access network device, the feedback information indicating the information about the measurement pilot signal received by the terminal in the $(x+T)^{th}$ time unit, to reduce overheads for uplink feedback.

In a possible implementation, the method further includes: The access network device calculates a downlink channel matrix in an $(x+T+1)^{th}$ time unit by using channel information in p time units as a channel information sample, where p is an integer greater than or equal to 1 and less than or equal to x+T.

In a possible implementation, the measurement pilot sent in each of the M' frequency domain units is a measurement pilot precoded by using a fourth matrix, and the fourth matrix satisfies a condition: Column coherence of a seventh matrix obtained by multiplying the fourth matrix by a third matrix is the smallest. The measurement pilot in each of the M' frequency domain units is precoded by using the fourth matrix, to implement space-domain dimension reduction of the one or more measurement pilots.

In a possible implementation, a downlink channel matrix in a time unit indicates channel information in the time unit, and the downlink channel matrix in each time unit is an N*M matrix, where N is an integer greater than or equal to 1. The third matrix satisfies a condition: An F-norm of a matrix difference between a product of the third matrix and a fifth matrix and a sixth matrix is the smallest, where the sixth matrix is an N*(M*T) matrix, column vectors in the sixth matrix include all column vectors in downlink channel matrices in the $x^{th}$ time unit to the $(x+T-1)^{th}$ time unit, column vectors in the fifth matrix correspond one-to-one to the column vectors in the sixth matrix, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N. This possible implementation provides a method for determining the third matrix.

In a possible implementation, the M' frequency domain units are determined by using a second matrix, and the second matrix satisfies a condition: Column coherence of a matrix obtained by multiplying the second matrix by a first matrix is the smallest. The second matrix is a row-extracted matrix, each row in the second matrix has only one non-zero element, and non-zero elements in different rows are in different locations. This possible implementation provides a method for determining the second matrix.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ downlink channel matrix and the fourth matrix, and the $s^{th}$ downlink channel matrix is a downlink channel matrix in an $(x+s-1)^{th}$ time unit in the $x^{th}$ time unit to the $(x+T-1)^{th}$ time unit, where m is an integer greater than or equal to 1 and less than or equal to M, and s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M. This possible implementation provides a method for determining the first matrix.

In a possible implementation, a measurement pilot sent in an $m'^{th}$ frequency domain unit in the M' frequency domain units is a measurement pilot precoded by using an $m'^{th}$ fourth submatrix in M' fourth submatrices in a fourth matrix, the fourth matrix includes M fourth submatrices corresponding one-to-one to the M frequency domain units, and the M' fourth submatrices are fourth submatrices corresponding to the M' frequency domain units, where an $m^{th}$ fourth submatrix in the M fourth submatrices satisfies a condition: Column coherence of an $m^{th}$ seventh submatrix obtained by multiplying the $m^{th}$ fourth submatrix by an $m^{th}$ third submatrix in a third matrix is the smallest. The third matrix includes M third submatrices, where m is an integer greater than or equal to 1 and less than or equal to M, and m' is an integer greater than or equal to 1 and less than or equal to M'. The measurement pilot in each of the M' frequency domain units is precoded by using each fourth submatrix in the fourth matrix, to implement space-domain dimension reduction of the one or more measurement pilots.

In a possible implementation, a downlink channel matrix in a time unit indicates channel information in the time unit, and the downlink channel matrix in each time unit is an $N*M$ matrix, where $N$ is an integer greater than or equal to 1. The $m^{th}$ third submatrix in the $M$ third submatrices satisfies a condition: An F-norm of a matrix difference between a product of the $m^{th}$ third submatrix and an $m^{th}$ fifth submatrix and an $m^{th}$ sixth submatrix is the smallest. The $m^{th}$ sixth submatrix is an $N*T$ matrix, column vectors in the $m^{th}$ sixth submatrix include $m^{th}$ column vectors in downlink channel matrices in the $x^{th}$ time unit to the $(x+T-1)^{th}$ time unit, column vectors in the $m^{th}$ fifth submatrix correspond one-to-one to the column vectors in the $m^{th}$ sixth submatrix, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than $N$. This possible implementation provides a method for determining the third matrix.

In a possible implementation, the $M'$ frequency domain units are determined by using a second matrix, and the second matrix satisfies a condition: Column coherence of a matrix obtained by multiplying the second matrix by a first matrix is the smallest. The second matrix is a row-extracted matrix, each row in the second matrix has only one non-zero element, and non-zero elements in different rows are in different locations. This possible implementation provides a method for determining the second matrix.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes $T$ column vectors arranged in a top-to-bottom sequence, an $s^{th}$ column vector in the $T$ column vectors is a product of an $m^{th}$ column in an $s^{th}$ downlink channel matrix and the $m^{th}$ fourth submatrix, and the $s^{th}$ downlink channel matrix is a downlink channel matrix in an $(x+s-1)^{th}$ time unit in the $x^{th}$ time unit to the $(x+T-1)^{th}$ time unit, where $s$ is an integer greater than or equal to 1 and less than or equal to $T$. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than $M$. This possible implementation provides a method for determining the first matrix.

According to a second aspect, a signal sending method is provided, including: A terminal receives a measurement pilot signal on a time-frequency resource for sending one or more measurement pilots, and determines feedback information, where the feedback information indicates information about the measurement pilot signal received by the terminal, the measurement pilot signal received by the terminal includes $N'*M'*R$ elements, each element represents the measurement pilot signal received by the terminal on one of $N'$ ports for sending the one or more measurement pilots, in one of $M'$ frequency domain units for sending the one or more measurement pilots, or on one of $R$ ports for receiving the measurement pilot signal, and $R$, $N'$, and $M'$ are all integers greater than or equal to 1. The terminal sends the feedback information to an access network device. According to the method provided in the second aspect, after measuring the one or more measurement pilots, the terminal does not perform channel estimation or compression and feedback, but directly feeds back, to the access network device, the feedback information indicating the information about the measurement pilot signal received by the terminal in an $(x+T)^{th}$ time unit, to reduce overheads for uplink feedback.

In a possible implementation, the feedback information specifically indicates amplitude information and phase information of each element in the measurement pilot signal received by the terminal.

In a possible implementation, the feedback information specifically indicates an absolute amplitude and an absolute phase of each element in the measurement pilot signal received by the terminal.

In a possible implementation, the measurement pilot signal received by the terminal includes a plurality of groups of elements, each group of elements includes more than one element, and the feedback information specifically indicates amplitude information and phase information of each group of elements.

In a possible implementation, the feedback information specifically indicates an absolute amplitude and an absolute phase of each group of elements.

In a possible implementation, the method further includes: The terminal receives first indication information and second indication information from the access network device, where the first indication information indicates location information of the $M'$ frequency domain units for sending the one or more measurement pilots, and the second indication information indicates a value of $N'$. That a terminal receives a measurement pilot signal on a time-frequency resource for sending one or more measurement pilots, and determines feedback information includes: The terminal receives the measurement pilot signal on $N'$ ports in each of the $M'$ frequency domain units, and determines the feedback information. In this possible implementation, the terminal may determine the frequency domain units for sending the one or more measurement pilots and a quantity of ports for sending the one or more measurement pilots.

According to a third aspect, a signal sending method is provided, including: A terminal obtains a channel information sample, where the channel information sample includes a first downlink channel matrix. The terminal determines a first matrix, a second matrix, and a first coefficient matrix based on the channel information sample, where First coefficient matrix=First downlink channel matrix*Second matrix, or First coefficient matrix=Second downlink channel matrix*Second matrix, where the second downlink channel matrix is determined by using the first downlink channel matrix. When First coefficient matrix=First downlink channel matrix*Second matrix, First downlink channel matrix=Second coefficient matrix*First matrix, and a quantity of columns in the first coefficient matrix is less than a quantity of columns in the first downlink channel matrix. When First coefficient matrix=Second downlink channel matrix*Second matrix, Second downlink channel matrix=Third coefficient matrix*First matrix, and a quantity of columns in the first coefficient matrix is less than a quantity of columns in the second downlink channel matrix. The terminal reports matrix information to an access network device, where the matrix information includes related information of the first coefficient matrix, the first matrix, and the second matrix, or the matrix information includes related information of the first coefficient matrix and a tenth matrix, where the tenth matrix is determined based on the first matrix and the second matrix. According to the method provided in the third aspect, the terminal may compress (perform frequency-domain compression or space-domain compression on) the first downlink channel matrix, to reduce overheads for uplink feedback.

In a possible implementation, the second coefficient matrix satisfies at least one of conditions: (1) A quantity of non-zero elements in the second coefficient matrix is less than a quantity of non-zero elements in the first downlink channel matrix. (2) When a ratio of a sum of power of P1 elements whose amplitudes are top in the first downlink channel matrix to power of the first downlink channel matrix is greater than a first threshold, and a ratio of a sum of power of P1-1 elements whose amplitudes are top in the first downlink channel matrix to the power of the first downlink channel matrix is less than the first threshold, a ratio of a sum of power of P2 elements whose amplitudes are top in the second coefficient matrix to power of the second coefficient matrix is greater than the first threshold, and a ratio of a sum of power of P2-1 elements whose amplitudes are top in the second coefficient matrix to the power of the second coefficient matrix is less than the first threshold, where P2<P1, both P1 and P2 are integers greater than or equal to 1, and the first threshold is an integer greater than 0 and less than or equal to 1. When the second coefficient matrix satisfies at least one of the conditions (1) and (2), it indicates that the second coefficient matrix is a sparse representation of the first downlink channel matrix. This makes it possible to compress the downlink channel matrix.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1. When the third coefficient matrix satisfies at least one of the conditions (1) and (2), it indicates that the third coefficient matrix is a sparse representation of the second downlink channel matrix. This makes it possible to compress the downlink channel matrix.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, the matrix information further includes related information of a third matrix and a fourth matrix, or the matrix information further includes related information of an eleventh matrix, where the eleventh matrix is determined based on the third matrix and the fourth matrix. The method further includes: The terminal determines the third matrix and the fourth matrix based on the channel information sample, where Second downlink channel matrix=Fourth matrix*First downlink channel matrix, First downlink channel matrix=Third matrix*Fourth coefficient matrix, and a quantity of rows in the second downlink channel matrix is less than a quantity of rows in the first downlink channel matrix. In this possible implementation, the terminal may further compress the first downlink channel matrix, to reduce the overheads for the uplink feedback.

In a possible implementation, the fourth coefficient matrix satisfies at least one of conditions: (1) A quantity of non-zero elements in the fourth coefficient matrix is less than the quantity of non-zero elements in the first downlink channel matrix. (2) When a ratio of a sum of power of P5 elements whose amplitudes are top in the first downlink channel matrix to the power of the first downlink channel matrix is greater than a third threshold, and a ratio of a sum of power of P5-1 elements whose amplitudes are top in the first downlink channel matrix to the power of the first downlink channel matrix is less than the third threshold, a ratio of a sum of power of P6 elements whose amplitudes are top in the fourth coefficient matrix to power of the fourth coefficient matrix is greater than the third threshold, and a ratio of a sum of power of P6-1 elements whose amplitudes are top in the fourth coefficient matrix to the power of the fourth coefficient matrix is less than the third threshold, where P6<P5, both P5 and P6 are integers greater than or equal to 1, and the third threshold is an integer greater than 0 and less than or equal to 1. When the fourth coefficient matrix satisfies at least one of the conditions (1) and (2), it indicates that the fourth coefficient matrix is a sparse representation of the first downlink channel matrix. This makes it possible to compress the downlink channel matrix.

In a possible implementation, the third matrix and/or the fourth matrix satisfy/satisfies at least one of conditions: (1) An amplitude of at least one element in the third matrix and/or the fourth matrix is different from an amplitude of at least one other element. (2) At least one row or at least one column in the third matrix and/or the fourth matrix is a non-geometric progression.

In a possible implementation, the channel information sample includes T N*M first downlink channel matrices, T, N, and M are all integers greater than or equal to 1, and the third matrix satisfies a condition: An F-norm of a matrix difference between a product of the third matrix and a fifth matrix and a sixth matrix is the smallest. The sixth matrix is an N*(M*T) matrix, column vectors in the sixth matrix include all column vectors in the T first downlink channel matrices, column vectors in the fifth matrix include all column vectors in T fourth coefficient matrices, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N. This possible implementation provides a method for determining the third matrix.

In a possible implementation, the fourth matrix satisfies a condition: Column coherence of a seventh matrix obtained by multiplying the fourth matrix by the third matrix is the smallest. This possible implementation provides a method for determining the fourth matrix.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the fourth matrix, and the $s^{th}$ first downlink channel matrix is a first downlink channel matrix in an $(x+s-1)^{th}$ time unit in an $x^{th}$ time unit to an $(x+T-1)^{th}$ time unit, where m is an integer greater than or equal to 1 and less than or equal to M, and s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M. This possible implementation provides a method for determining the first matrix.

In a possible implementation, the channel information sample includes T N*M first downlink channel matrices, T, N, and M are all integers greater than or equal to 1, the third matrix includes M third submatrices, and an $m^{th}$ third submatrix in the M third submatrices satisfies a condition: An F-norm of a matrix difference between a product of the $m^{th}$ third submatrix and an $m^{th}$ fifth submatrix and an $m^{th}$ sixth submatrix is the smallest, where m is an integer greater than or equal to 1 and less than or equal to M. The $m^{th}$ sixth submatrix is an N*T matrix, column vectors in the $m^{th}$ sixth submatrix include $m^{th}$ column vectors in the T first downlink channel matrices, column vectors in the $m^{th}$ fifth submatrix include $m^{th}$ column vectors in T fourth coefficient matrices, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than N. This possible implementation provides a method for determining the third matrix.

In a possible implementation, the fourth matrix includes M fourth submatrices, and an $m^{th}$ fourth submatrix in the M fourth submatrices satisfies a condition: Column coherence of an $m^{th}$ seventh submatrix obtained by multiplying the $m^{th}$ fourth submatrix by the $m^{th}$ third submatrix is the smallest. This possible implementation provides a method for determining the fourth matrix.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the $m^{th}$ fourth submatrix, and the $s^{th}$ first downlink channel matrix is a first downlink channel matrix in an $(x+s-1)^{th}$ time unit in an $x^{th}$ time unit to an $(x+T-1)^{th}$ time unit, where s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M. This possible implementation provides a method for determining the first matrix.

In a possible implementation, the second matrix satisfies a condition: Column coherence of a matrix obtained by multiplying the second matrix by the first matrix is the smallest. This possible implementation provides a method for determining the second matrix.

In a possible implementation, T indicates a total quantity of time units included in the channel information sample. N indicates a product of a quantity of ports for sending one or more measurement pilots and a quantity of ports used by the terminal to receive a measurement pilot signal that are configured by the access network device, and M indicates a quantity of frequency domain units for sending the one or more measurement pilots that is configured by the access network device. Alternatively, N indicates a quantity of frequency domain units for sending one or more measurement pilots that is configured by the access network device, and M indicates a product of a quantity of ports for sending the one or more measurement pilots and a quantity of ports used by the terminal to receive a measurement pilot signal that are configured by the access network device, where the one or more measurement pilots are used to measure channel state information (CSI).

In a possible implementation, a report periodicity of the first coefficient matrix is less than report periodicities of both the first matrix and the second matrix, or a report periodicity of the first coefficient matrix is less than a report periodicity of the tenth matrix. In this possible implementation, the first matrix and the second matrix (or the tenth matrix) do not need to be frequently reported, thereby reducing the overheads for the uplink feedback.

In a possible implementation, a report periodicity of the first coefficient matrix is less than report periodicities of all the first matrix, the second matrix, the third matrix, and the fourth matrix, or a report periodicity of the first coefficient matrix is less than report periodicities of both the tenth matrix and the eleventh matrix. In this possible implementation, the third matrix and the fourth matrix (or the eleventh matrix) do not need to be frequently reported, thereby reducing the overheads for the uplink feedback.

According to a fourth aspect, a channel matrix obtaining method is provided, including: An access network device receives matrix information from a terminal, where the matrix information includes related information of a first coefficient matrix, a first matrix, and a second matrix, or the matrix information includes related information of a first coefficient matrix and a tenth matrix, where the tenth matrix is determined based on the first matrix and the second matrix. First coefficient matrix=First downlink channel matrix*Second matrix, or First coefficient matrix=Second downlink channel matrix*Second matrix, where the second downlink channel matrix is determined by using the first downlink channel matrix. When First coefficient matrix=First downlink channel matrix*Second matrix, First downlink channel matrix=Second coefficient matrix*First matrix, and a quantity of columns in the first coefficient matrix is less than a quantity of columns in the first downlink channel matrix. When First coefficient matrix=Second downlink channel matrix*Second matrix, Second downlink channel matrix=Third coefficient matrix*First matrix, and a quantity of columns in the first coefficient matrix is less than a quantity of columns in the second downlink channel matrix. The access network device obtains the first downlink channel matrix based on the matrix information. According to the method provided in the fourth aspect, the terminal may compress (perform frequency-domain compression or space-domain compression on) the first downlink channel matrix, to reduce overheads for uplink feedback.

In a possible implementation, the second coefficient matrix satisfies at least one of conditions: (1) A quantity of non-zero elements in the second coefficient matrix is less than a quantity of non-zero elements in the first downlink channel matrix. (2) When a ratio of a sum of power of P1 elements whose amplitudes are top in the first downlink channel matrix to power of the first downlink channel matrix is greater than a first threshold, and a ratio of a sum of power of P1-1 elements whose amplitudes are top in the first downlink channel matrix to the power of the first downlink channel matrix is less than the first threshold, a ratio of a sum of power of P2 elements whose amplitudes are top in the second coefficient matrix to power of the second coefficient matrix is greater than the first threshold, and a ratio of a sum of power of P2-1 elements whose amplitudes are top in the second coefficient matrix to the power of the second coefficient matrix is less than the first threshold, where P2<P1, both P1 and P2 are integers greater than or equal to 1, and the first threshold is an integer greater than 0 and less than or equal to 1.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, a report periodicity of the first coefficient matrix is less than report periodicities of both the first matrix and the second matrix, or a report periodicity of the first coefficient matrix is less than a report periodicity of the tenth matrix. In this possible implementation, the first matrix and the second matrix (or the tenth matrix) do not need to be frequently reported, thereby reducing the overheads for the uplink feedback.

According to a fifth aspect, a channel matrix obtaining method is provided, including: An access network device receives matrix information from a terminal, where the matrix information includes a first coefficient matrix, a first matrix, a second matrix, a third matrix, and a fourth matrix, or the matrix information includes related information of a first coefficient matrix, a tenth matrix, and an eleventh matrix, where the tenth matrix is determined based on the first matrix and the second matrix, and the eleventh matrix is determined based on the third matrix and the fourth matrix. First coefficient matrix=Second downlink channel matrix*Second matrix, and the second downlink channel matrix is determined by using a first downlink channel matrix. Second downlink channel matrix=Third coefficient matrix*First matrix, and a quantity of columns in the first coefficient matrix is less than a quantity of columns in the second downlink channel matrix. Second downlink channel matrix=Fourth matrix*First downlink channel matrix, First downlink channel matrix=Third matrix*Fourth coefficient matrix, and a quantity of rows in the second downlink channel matrix is less than a quantity of rows in the first downlink channel matrix. The access network device obtains the first downlink channel matrix based on the matrix information. According to the method provided in the fifth aspect, the terminal may compress (perform frequency-domain compression or space-domain compression on) the first downlink channel matrix, to reduce overheads for uplink feedback.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

In a possible implementation, the fourth coefficient matrix satisfies at least one of conditions: (1) A quantity of non-zero elements in the fourth coefficient matrix is less than a quantity of non-zero elements in the first downlink channel matrix. (2) When a ratio of a sum of power of P5 elements whose amplitudes are top in the first downlink channel matrix to power of the first downlink channel matrix is greater than a third threshold, and a ratio of a sum of power of P5-1 elements whose amplitudes are top in the first downlink channel matrix to the power of the first downlink channel matrix is less than the third threshold, a ratio of a sum of power of P6 elements whose amplitudes are top in the fourth coefficient matrix to power of the fourth coefficient matrix is greater than the third threshold, and a ratio of a sum of power of P6-1 elements whose amplitudes are top in the fourth coefficient matrix to the power of the fourth coefficient matrix is less than the third threshold, where P6<P5, both P5 and P6 are integers greater than or equal to 1, and the third threshold is an integer greater than 0 and less than or equal to 1.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, the third matrix and/or the fourth matrix satisfy/satisfies at least one of conditions: (1) An amplitude of at least one element in the third matrix and/or the fourth matrix is different from an amplitude of at least one other element. (2) At least one row or at least one column in the third matrix and/or the fourth matrix is a non-geometric progression.

In a possible implementation, a report periodicity of the first coefficient matrix is less than report periodicities of all the first matrix, the second matrix, the third matrix, and the fourth matrix, or a report periodicity of the first coefficient matrix is less than report periodicities of both the tenth matrix and the eleventh matrix. In this possible implementation, the first matrix, the second matrix, the third matrix, and the fourth matrix (or the tenth matrix and the eleventh matrix) do not need to be frequently reported, thereby reducing the overheads for the uplink feedback.

According to a sixth aspect, a signal sending apparatus is provided, including a communication unit and a processing unit. The processing unit is configured to obtain a channel information sample, where the channel information sample includes channel information in an $x^{th}$ time unit to an $(x+T-1)^{th}$ time unit, and both x and T are integers greater than or equal to 1. The processing unit is further configured to determine M' frequency domain units in M frequency domain units in an $(x+T)^{th}$ time unit based on the channel information sample, where the M' frequency domain units are used to send one or more measurement pilots, the one or more measurement pilots are used to measure CSI, both M' and M are integers greater than or equal to 1, and M'<M. The communication unit is configured to send the one or more measurement pilots to a terminal in the M' frequency domain units.

In a possible implementation, the communication unit is further configured to send first indication information to the terminal, where the first indication information indicates location information of the M' frequency domain units.

In a possible implementation, the communication unit is specifically configured to: send one or more measurement pilots of N' ports to the terminal in each of the M' frequency domain units based on the channel information sample, and send second indication information to the terminal, where the second indication information indicates a value of N', and N' is an integer greater than or equal to 1.

In a possible implementation, the communication unit is further configured to receive feedback information from the terminal, where the feedback information indicates information about a measurement pilot signal received by the terminal in the $(x+T)^{th}$ time unit. The processing unit is further configured to determine a downlink channel matrix in the $(x+T)^{th}$ time unit based on the feedback information.

In a possible implementation, the processing unit is further configured to calculate a downlink channel matrix in an $(x+T+1)^{th}$ time unit by using channel information in p time units as a channel information sample, where p is an integer greater than or equal to 1 and less than or equal to x+T.

In a possible implementation, the measurement pilot sent in each of the M' frequency domain units is a measurement pilot precoded by using a fourth matrix, and the fourth matrix satisfies a condition: Column coherence of a seventh matrix obtained by multiplying the fourth matrix by a third matrix is the smallest.

In a possible implementation, a downlink channel matrix in a time unit indicates channel information in the time unit, and the downlink channel matrix in each time unit is an N*M matrix, where N is an integer greater than or equal to 1. The third matrix satisfies a condition: An F-norm of a matrix difference between a product of the third matrix and a fifth matrix and a sixth matrix is the smallest, where the sixth matrix is an N*(M*T) matrix, column vectors in the sixth matrix include all column vectors in downlink channel matrices in the $x^{th}$ time unit to the $(x+T-1)^{th}$ time unit, column vectors in the fifth matrix correspond one-to-one to the column vectors in the sixth matrix, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N.

In a possible implementation, the M' frequency domain units are determined by using a second matrix, and the second matrix satisfies a condition: Column coherence of a matrix obtained by multiplying the second matrix by a first matrix is the smallest. The second matrix is a row-extracted matrix, each row in the second matrix has only one non-zero element, and non-zero elements in different rows are in different locations.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ downlink channel matrix and the fourth matrix, and the $s^{th}$ downlink channel matrix is a downlink channel matrix in an $(x+s-1)^{th}$ time unit in the $x^{th}$ time unit to the $(x+T-1)^{th}$ time unit, where m is an integer greater than or equal to 1 and less than or equal to M, and s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

In a possible implementation, a measurement pilot sent in an $m'^{th}$ frequency domain unit in the M' frequency domain units is a measurement pilot precoded by using an $m'^{th}$ fourth submatrix in M' fourth submatrices in a fourth matrix, the fourth matrix includes M fourth submatrices corresponding one-to-one to the M frequency domain units, and the M' fourth submatrices are fourth submatrices corresponding to the M' frequency domain units, where an $m^{th}$ fourth submatrix in the M fourth submatrices satisfies a condition: Column coherence of an $m^{th}$ seventh submatrix obtained by multiplying the $m^{th}$ fourth submatrix by an $m^{th}$ third submatrix in a third matrix is the smallest. The third matrix includes M third submatrices, where m is an integer greater than or equal to 1 and less than or equal to M, and m' is an integer greater than or equal to 1 and less than or equal to M'.

In a possible implementation, a downlink channel matrix in a time unit indicates channel information in the time unit, and the downlink channel matrix in each time unit is an N*M matrix, where N is an integer greater than or equal to 1, and an $m^{th}$ third submatrix in the M third submatrices satisfies a condition: An F-norm of a matrix difference between a product of the $m^{th}$ third submatrix and an $m^{th}$ fifth submatrix and an $m^{th}$ sixth submatrix is the smallest. The $m^{th}$ sixth submatrix is an N*T matrix, column vectors in the $m^{th}$ sixth submatrix include $m^{th}$ column vectors in downlink channel matrices in the $x^{th}$ time unit to the $(x+T-1)^{th}$ time unit, column vectors in the $m^{th}$ fifth submatrix correspond one-to-one to the column vectors in the $m^{th}$ sixth submatrix, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than N.

In a possible implementation, the M' frequency domain units are determined by using a second matrix, and the second matrix satisfies a condition: Column coherence of a matrix obtained by multiplying the second matrix by a first matrix is the smallest. The second matrix is a row-extracted matrix, each row in the second matrix has only one non-zero element, and non-zero elements in different rows are in different locations.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ downlink channel matrix and the $m^{th}$ fourth submatrix, and the $s^{th}$ downlink channel matrix is a downlink channel matrix in an $(x+s-1)^{th}$ time unit in the $x^{th}$ time unit to the $(x+T-1)^{th}$ time unit, where s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

According to a seventh aspect, a signal sending apparatus is provided, including a communication unit and a processing unit. The processing unit is configured to: receive, through the communication unit, a measurement pilot signal on a time-frequency resource for sending one or more measurement pilots, and determine feedback information, where the feedback information indicates information about the measurement pilot signal received by the apparatus, the measurement pilot signal received by the apparatus includes N'*M'*R elements, each element represents the measurement pilot signal received by the apparatus on one of N' ports for sending the one or more measurement pilots, in one of M' frequency domain units for sending the one or more measurement pilots, or on one of R ports for receiving the measurement pilot signal, and R, N', and M' are all integers greater than or equal to 1. The processing unit is further configured to send the feedback information to an access network device through the communication unit.

In a possible implementation, the feedback information specifically indicates amplitude information and phase information of each element in the measurement pilot signal received by the apparatus.

In a possible implementation, the feedback information specifically indicates an absolute amplitude and an absolute phase of each element in the measurement pilot signal received by the apparatus.

In a possible implementation, the measurement pilot signal received by the apparatus includes a plurality of groups of elements, each group of elements includes more than one element, and the feedback information specifically indicates amplitude information and phase information of each group of elements.

In a possible implementation, the feedback information specifically indicates an absolute amplitude and an absolute phase of each group of elements.

In a possible implementation, the processing unit is further configured to receive first indication information and second indication information from the access network device through the communication unit, where the first indication information indicates location information of the M' frequency domain units for sending the one or more measurement pilots, and the second indication information indicates a value of N'. The processing unit is specifically configured to: receive the measurement pilot signal on N' ports in each of the M' frequency domain units, and determine the feedback information.

According to an eighth aspect, a signal sending apparatus is provided, including a communication unit and a processing unit. The processing unit is configured to obtain a channel information sample, where the channel information sample includes a first downlink channel matrix. The processing unit is further configured to determine a first matrix, a second matrix, and a first coefficient matrix based on the channel information sample, where First coefficient matrix=First downlink channel matrix*Second matrix, or First coefficient matrix=Second downlink channel matrix*Second matrix, where the second downlink channel matrix is determined by using the first downlink channel matrix. When First coefficient matrix=First downlink channel matrix*Second matrix, First downlink channel matrix=Second coefficient matrix*First matrix, and a quantity of columns in the first coefficient matrix is less than a quantity of columns in the first downlink channel matrix. When First coefficient matrix=Second downlink channel matrix*Second matrix, Second downlink channel matrix=Third coefficient matrix*First matrix, and a quantity of columns in the first coefficient matrix is less than a quantity of columns in the second downlink channel matrix. The communication unit is configured to report matrix information to an access network device, where the matrix information includes related information of the first coefficient matrix, the first matrix, and the second matrix, or the matrix information includes related information of the first coefficient matrix and a tenth matrix, where the tenth matrix is determined based on the first matrix and the second matrix.

In a possible implementation, the second coefficient matrix satisfies at least one of conditions: (1) A quantity of non-zero elements in the second coefficient matrix is less than a quantity of non-zero elements in the first downlink channel matrix. (2) When a ratio of a sum of power of P1 elements whose amplitudes are top in the first downlink channel matrix to power of the first downlink channel matrix is greater than a first threshold, and a ratio of a sum of power of P1-1 elements whose amplitudes are top in the first downlink channel matrix to the power of the first downlink channel matrix is less than the first threshold, a ratio of a sum of power of P2 elements whose amplitudes are top in the second coefficient matrix to power of the second coefficient matrix is greater than the first threshold, and a ratio of a sum of power of P2-1 elements whose amplitudes are top in the second coefficient matrix to the power of the second coefficient matrix is less than the first threshold, where P2<P1, both P1 and P2 are integers greater than or equal to 1, and the first threshold is an integer greater than 0 and less than or equal to 1.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, the matrix information further includes related information of a third matrix and a fourth matrix, or the matrix information further includes related information of an eleventh matrix, where the eleventh matrix is determined based on the third matrix and the fourth matrix. The processing unit is further configured to determine the third matrix and the fourth matrix based on the channel information sample, where Second downlink channel matrix=Fourth matrix*First downlink channel matrix, First downlink channel matrix=Third matrix*Fourth coefficient matrix, and a quantity of rows in the second downlink channel matrix is less than a quantity of rows in the first downlink channel matrix.

In a possible implementation, the fourth coefficient matrix satisfies at least one of conditions: (1) A quantity of non-zero elements in the fourth coefficient matrix is less than the quantity of non-zero elements in the first downlink channel matrix. (2) When a ratio of a sum of power of P5 elements whose amplitudes are top in the first downlink channel matrix to power of the first downlink channel matrix is greater than a third threshold, and a ratio of a sum of power of P5-1 elements whose amplitudes are top in the first downlink channel matrix to the power of the first downlink channel matrix is less than the third threshold, a ratio of a sum of power of P6 elements whose amplitudes are top in the fourth coefficient matrix to power of the fourth coefficient matrix is greater than the third threshold, and a ratio of a sum of power of P6-1 elements whose amplitudes are top in the fourth coefficient matrix to the power of the fourth coefficient matrix is less than the third threshold, where P6<P5, both P5 and P6 are integers greater than or equal to 1, and the third threshold is an integer greater than 0 and less than or equal to 1.

In a possible implementation, the third matrix and/or fourth matrix satisfy/satisfies at least one of conditions: (1) An amplitude of at least one element in the third matrix and/or the fourth matrix is different from an amplitude of at least one other element. (2) At least one row or at least one column in the third matrix and/or the fourth matrix is a non-geometric progression.

In a possible implementation, the channel information sample includes T $N*M$ first downlink channel matrices, T, N, and M are all integers greater than or equal to 1, and the third matrix satisfies a condition: An F-norm of a matrix difference between a product of the third matrix and a fifth matrix and a sixth matrix is the smallest. The sixth matrix is an $N*(M*T)$ matrix, column vectors in the sixth matrix include all column vectors in the T first downlink channel matrices, column vectors in the fifth matrix include all column vectors in T fourth coefficient matrices, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N.

In a possible implementation, the fourth matrix satisfies a condition: Column coherence of a seventh matrix obtained by multiplying the fourth matrix by the third matrix is the smallest.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the fourth matrix, and the $s^{th}$ first downlink channel matrix is a first downlink channel matrix in an $(x+s-1)^{th}$ time unit in an $x^{th}$ time unit to an $(x+T-1)^{th}$ time unit, where m is an integer greater than or equal to 1 and less than or equal to M, and s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

In a possible implementation, the channel information sample includes T $N*M$ first downlink channel matrices, T, N, and M are all integers greater than or equal to 1, the third matrix includes M third submatrices, and an $m^{th}$ third submatrix in the M third submatrices satisfies a condition: An F-norm of a matrix difference between a product of the $m^{th}$ third submatrix and an $m^{th}$ fifth submatrix and an $m^{th}$ sixth submatrix is the smallest, where m is an integer greater than or equal to 1 and less than or equal to M. The $m^{th}$ sixth submatrix is an $N*T$ matrix, column vectors in the $m^{th}$ sixth submatrix include $m^{th}$ column vectors in the T first downlink channel matrices, column vectors in the $m^{th}$ fifth submatrix include $m^{th}$ column vectors in T fourth coefficient matrices, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than N.

In a possible implementation, the fourth matrix includes M fourth submatrices, and an $m^{th}$ fourth submatrix in the M fourth submatrices satisfies a condition: Column coherence of an $m^{th}$ seventh submatrix obtained by multiplying the $m^{th}$ fourth submatrix by the $m^{th}$ third submatrix is the smallest.

In a possible implementation, the first matrix satisfies a condition: An F-norm of a matrix difference between a product of the first matrix and an eighth matrix and a conjugate transposition matrix of a ninth matrix is the smallest. The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the $m^{th}$ fourth submatrix, and the $s^{th}$ first downlink channel matrix is a first downlink channel matrix in an $(x+s-1)^{th}$ time unit in an $x^{th}$ time unit to an $(x+T-1)^{th}$ time unit, where s is an integer greater than or equal to 1 and less than or equal to T. Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

In a possible implementation, the second matrix satisfies a condition: Column coherence of a matrix obtained by multiplying the second matrix by the first matrix is the smallest.

In a possible implementation, T indicates a total quantity of time units included in the channel information sample. N indicates a product of a quantity of ports for sending one or more measurement pilots and a quantity of ports used by the apparatus to receive a measurement pilot signal that are configured by the access network device, and M indicates a quantity of frequency domain units for sending the one or more measurement pilots that is configured by the access network device. Alternatively, N indicates a quantity of frequency domain units for sending one or more measurement pilots that is configured by the access network device, and M indicates a product of a quantity of ports for sending the one or more measurement pilots and a quantity of ports used by the apparatus to receive a measurement pilot signal that are configured by the access network device, where the one or more measurement pilots are used to measure channel state information (CSI).

In a possible implementation, a report periodicity of the first coefficient matrix is less than report periodicities of both the first matrix and the second matrix, or a report periodicity of the first coefficient matrix is less than a report periodicity of the tenth matrix.

In a possible implementation, a report periodicity of the first coefficient matrix is less than report periodicities of all the first matrix, the second matrix, the third matrix, and the fourth matrix, or a report periodicity of the first coefficient matrix is less than report periodicities of both the tenth matrix and the eleventh matrix.

According to a ninth aspect, a channel matrix obtaining apparatus is provided, including a communication unit and a processing unit. The communication unit is configured to receive matrix information from a terminal, where the matrix information includes related information of a first coefficient matrix, a first matrix, and a second matrix, or the matrix information includes related information of a first coefficient matrix and a tenth matrix, where the tenth matrix is determined based on the first matrix and the second matrix. First coefficient matrix=First downlink channel matrix*Second matrix, or First coefficient matrix=Second downlink channel matrix*Second matrix, where the second downlink channel matrix is determined by using the first downlink channel matrix. When First coefficient matrix=First downlink channel matrix*Second matrix, First downlink channel matrix=Second coefficient matrix*First matrix, and a quantity of columns in the first coefficient matrix is less than a quantity of columns in the first downlink channel matrix. When First coefficient matrix=Second downlink channel matrix*Second matrix, Second downlink channel matrix=Third coefficient matrix*First matrix, and a quantity of columns in the first coefficient matrix is less than a quantity of columns in the second downlink channel matrix. The processing unit is configured to obtain the first downlink channel matrix based on the matrix information.

In a possible implementation, the second coefficient matrix satisfies at least one of conditions: (1) A quantity of non-zero elements in the second coefficient matrix is less than a quantity of non-zero elements in the first downlink channel matrix. (2) When a ratio of a sum of power of P1 elements whose amplitudes are top in the first downlink channel matrix to power of the first downlink channel matrix is greater than a first threshold, and a ratio of a sum of power of P1-1 elements whose amplitudes are top in the first downlink channel matrix to the power of the first downlink channel matrix is less than the first threshold, a ratio of a sum of power of P2 elements whose amplitudes are top in the second coefficient matrix to power of the second coefficient matrix is greater than the first threshold, and a ratio of a sum of power of P2-1 elements whose amplitudes are top in the second coefficient matrix to the power of the second coefficient matrix is less than the first threshold, where P2<P1, both P1 and P2 are integers greater than or equal to 1, and the first threshold is an integer greater than 0 and less than or equal to 1.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, a report periodicity of the first coefficient matrix is less than report periodicities of both the first matrix and the second matrix, or a report periodicity of the first coefficient matrix is less than a report periodicity of the tenth matrix.

According to a tenth aspect, a channel matrix obtaining apparatus is provided, including a communication unit and a processing unit. The communication unit is configured to receive matrix information from a terminal, where the matrix information includes a first coefficient matrix, a first matrix, a second matrix, a third matrix, and a fourth matrix, or the matrix information includes related information of a first coefficient matrix, a tenth matrix, and an eleventh matrix, where the tenth matrix is determined based on the first matrix and the second matrix, and the eleventh matrix is determined based on the third matrix and the fourth matrix. First coefficient matrix=Second downlink channel matrix*Second matrix, and the second downlink channel matrix is determined by using a first downlink channel matrix. Second downlink channel matrix=Third coefficient matrix*First matrix, and a quantity of columns in the first coefficient matrix is less than a quantity of columns in the second downlink channel matrix. Second downlink channel matrix=Fourth matrix*First downlink channel matrix, First downlink channel matrix=Third matrix*Fourth coefficient matrix, and a quantity of rows in the second downlink channel matrix is less than a quantity of rows in the first downlink channel matrix. The processing unit is configured to obtain the first downlink channel matrix based on the matrix information.

In a possible implementation, the third coefficient matrix satisfies at least one of conditions: (1) A quantity of non-zero elements in the third coefficient matrix is less than a quantity of non-zero elements in the second downlink channel matrix. (2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

In a possible implementation, the fourth coefficient matrix satisfies at least one of conditions: (1) A quantity of non-zero elements in the fourth coefficient matrix is less than a quantity of non-zero elements in the first downlink channel matrix. (2) When a ratio of a sum of power of P5 elements whose amplitudes are top in the first downlink channel matrix to power of the first downlink channel matrix is greater than a third threshold, and a ratio of a sum of power of P5-1 elements whose amplitudes are top in the first downlink channel matrix to the power of the first downlink channel matrix is less than the third threshold, a ratio of a sum of power of P6 elements whose amplitudes are top in the fourth coefficient matrix to power of the fourth coefficient matrix is greater than the third threshold, and a ratio of a sum of power of P6-1 elements whose amplitudes are top in the fourth coefficient matrix to the power of the fourth coefficient matrix is less than the third threshold, where P6<P5, both P5 and P6 are integers greater than or equal to 1, and the third threshold is an integer greater than 0 and less than or equal to 1.

In a possible implementation, the first matrix and/or the second matrix satisfy/satisfies at least one of conditions: (1) An amplitude of at least one element in the first matrix and/or the second matrix is different from an amplitude of at least one other element. (2) At least one row or at least one column in the first matrix and/or the second matrix is a non-geometric progression.

In a possible implementation, the third matrix and/or the fourth matrix satisfy/satisfies at least one of conditions: (1) An amplitude of at least one element in the third matrix and/or the fourth matrix is different from an amplitude of at least one other element. (2) At least one row or at least one column in the third matrix and/or the fourth matrix is a non-geometric progression.

In a possible implementation, a report periodicity of the first coefficient matrix is less than report periodicities of all the first matrix, the second matrix, the third matrix, and the fourth matrix, or a report periodicity of the first coefficient matrix is less than report periodicities of both the tenth matrix and the eleventh matrix.

According to an eleventh aspect, a signal sending apparatus is provided, including a processor, where the processor is coupled to a memory. Optionally, the apparatus further includes at least one communication interface and a communication bus. The memory is configured to store computer-executable instructions. The processor, the memory, and the at least one communication interface are connected through the communication bus. The processor executes the computer-executable instructions stored in the memory, to enable the signal sending apparatus to implement any method provided in any one of the first aspect to the third aspect. The apparatus may exist in a form of a chip product.

According to a twelfth aspect, a channel matrix obtaining apparatus is provided, including a processor, where the processor is coupled to a memory. Optionally, the apparatus further includes at least one communication interface and a communication bus. The memory is configured to store computer-executable instructions. The processor, the memory, and the at least one communication interface are connected through the communication bus. The processor executes the computer-executable instructions stored in the memory, to enable the channel matrix obtaining apparatus to implement any method provided in the fourth aspect or the fifth aspect. The apparatus may exist in a form of a chip product.

According to a thirteenth aspect, a communication system is provided, including: the signal sending apparatuses provided in the sixth aspect and the seventh aspect, the signal sending apparatus provided in the eighth aspect and the channel matrix obtaining apparatus provided in the ninth aspect, or the signal sending apparatus provided in the eighth aspect and the channel matrix obtaining apparatus provided in the tenth aspect.

According to a fourteenth aspect, a computer-readable storage medium is provided, including instructions. When the instructions are run on a computer, the computer is enabled to perform any method provided in any one of the first aspect to the fifth aspect.

According to a fifteenth aspect, a computer program product including instructions is provided. When the computer program product runs on a computer, the computer is enabled to perform any method provided in any one of the first aspect to the fifth aspect.

According to a sixteenth aspect, a chip is provided. The chip includes a processor and an interface, and the processor is coupled to a memory through the interface. When the processor executes a computer program or instructions in the memory, any method provided in any one of the first aspect to the fifth aspect is performed.

In the foregoing aspects, for beneficial effects of an apparatus corresponding to a method, refer to the beneficial effects of the corresponding method. It should be noted that various possible implementations of any one of the foregoing aspects may be combined provided that the solutions are not contradictory.

BRIEF DESCRIPTION OF DRAWINGS

FIG. 8 to FIG. 12 each are a flowchart of a signal sending method according to an embodiment of this application;

FIG. 13 is a schematic diagram of a sparse representation in space domain according to an embodiment of this application;

DESCRIPTION OF EMBODIMENTS

In the present disclosure, unless otherwise specified, "/" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and do not indicate a definite difference either.

It should be noted that, in the present disclosure, words such as "example" or "for example" are used to represent giving an example, an illustration, or a description. Any embodiment or design scheme described as an "example" or "for example" in the present disclosure should not be explained as being more preferred or having more advantages than another embodiment or design scheme. Exactly, use of the words such as "example" or "for example" is intended to present a relative concept in a specific manner.

Figures 1, 2:
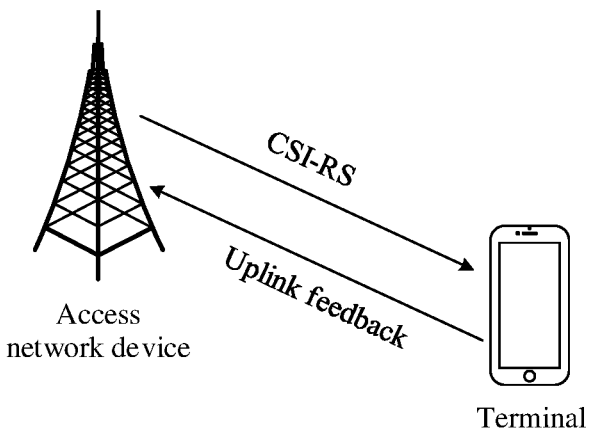
FIG. 1 is a schematic diagram of a communication scenario.
FIG. 2 is a schematic diagram of a change of a quantity of CSI-RSs that occurs as a quantity of ports increases.
Figure 3:
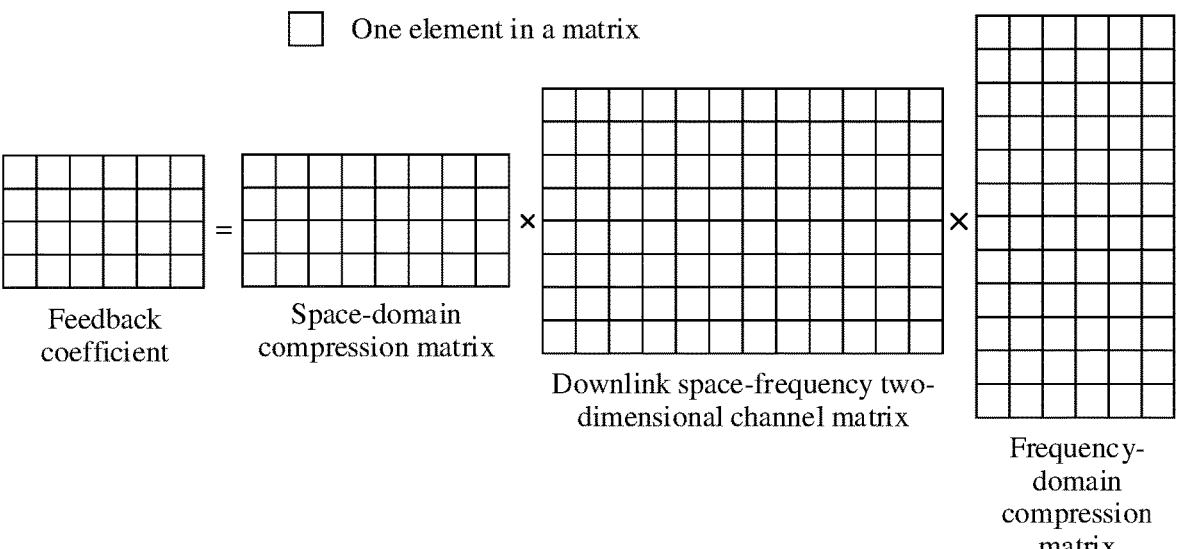
FIG. 3 is a schematic diagram of a solution to reducing uplink feedback.

Network elements in embodiments of this application include an access network device and a terminal in a communication network. For details, refer to FIG. 1.

A communication system in embodiments of this application includes but is not limited to a long term evolution (LTE) system, a 5G system, an NR system, a wireless local area network (WLAN) system, a future evolved system, or a system converging a plurality of communication technologies. For example, a method provided in embodiments of this application may be specifically applied to an evolved-universal terrestrial radio access network (E-UTRAN) system and a next generation-radio access network (NG-RAN) system.

The access network device in embodiments of this application is a network-side entity configured to send a signal, receive a signal, or send and receive a signal. The access network device may be an apparatus that is deployed in a radio access network (RAN) and that provides a wireless communication function for the terminal. For example, the access network device may be a transmission reception point (TRP), a base station, control nodes in various forms, or a road side unit (RSU). The base station may be a macro base station, a micro base station (also referred to as a small cell), a relay station, an access point (AP), or the like in various forms. For example, the base station may be an evolved NodeB (eNB or eNodeB), a next generation node base station (gNB), a next generation eNB (ng-eNB), a relay node (RN), or an integrated access and backhaul (IAB) node. In systems using different radio access technologies (RATs), names of devices having a function of a base station may be different. For example, the base station may be referred to as an eNB or an eNodeB in the LTE system, and may be referred to as a gNB in the 5G system or the NR system. A specific name of the base station is not limited in this application. The control node may be connected to a plurality of base stations, and configure resources for a plurality of terminals covered by the plurality of base stations. For example, the control node may be a network controller or a radio controller (for example, a radio controller in a cloud radio access network (CRAN) scenario). The access network device may alternatively be an access network device in a future evolved public land mobile network (PLMN) or the like.

The terminal in embodiments of this application may be a user-side entity configured to receive a signal, send a signal, or receive and send a signal. The terminal is configured to provide a user with one or both of a voice service and a data connectivity service. The terminal may also be referred to as user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a vehicle-to-everything (V2X) device, for example, a smart car (or intelligent car), a digital car, an unmanned car (driverless car, pilotless car, or automobile), an autonomous car (or self-driving car), a pure electric vehicle (pure EV or battery EV), a hybrid electric vehicle (HEV), a range extended electric vehicle (range extended EV, REEV), a plug-in hybrid electric vehicle (plug-in HEV, PHEV), or a new energy vehicle. Alternatively, the terminal may be a device-to-device (D2D) device, for example, an electricity meter or a water meter. Alternatively, the terminal may be a mobile station (MS), a subscriber unit, an unmanned aerial vehicle, an internet of things (IoT) device, a station (ST) in a WLAN, a cellular phone, a smartphone, a cordless telephone set, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device, another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

In the background, the CSI-RS overheads for estimating the downlink space-frequency two-dimensional channel matrix cannot be reduced. Furthermore, in the method for reducing the overheads for the uplink feedback in the background, space-frequency beams used for the uplink feedback include fixed DFT vectors, and usually cannot provide a most sparse representation of the downlink space-frequency two-dimensional channel matrix. Therefore, the overheads for the uplink feedback can still be further reduced.

To resolve these problems, this application provides a signal sending method. The following uses Embodiment 1 and Embodiment 2 as examples to describe the signal sending method provided in embodiments of this application.

Figure 4:
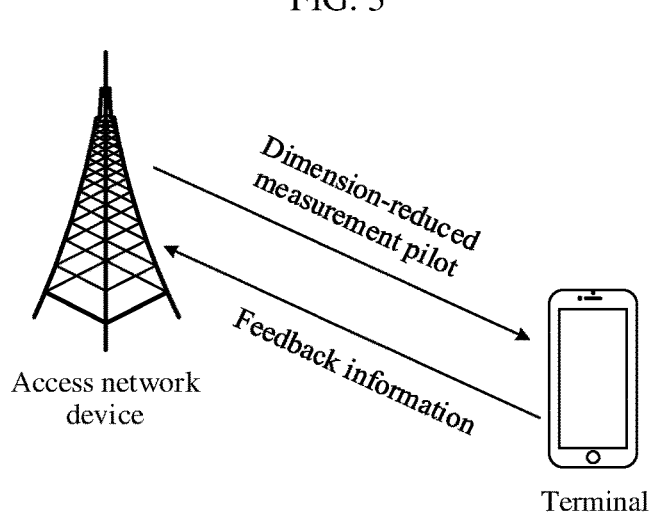
FIG. 4 and FIG. 5 each are a schematic diagram of a communication scenario according to an embodiment of this application.

As shown in FIG. 4, in Embodiment 1, an access network device sends a dimension-reduced (in the frequency domain and/or the space domain) measurement pilot to a terminal, to reduce measurement pilot overheads for estimating a downlink channel matrix. In addition, the terminal may not perform channel estimation, but directly feed back, to the access network device, feedback information indicating information about a measurement pilot signal received by the terminal, to reduce overheads for uplink feedback. The measurement pilot in embodiments of this application is used to measure CSI. For example, the measurement pilot may be a CSI-RS, or may be another pilot for measuring the CSI. This is not limited in this application. The downlink channel matrix in embodiments of this application may be a downlink space-frequency two-dimensional channel matrix, or may be another downlink channel matrix. This is not limited in this application.

Figure 5:
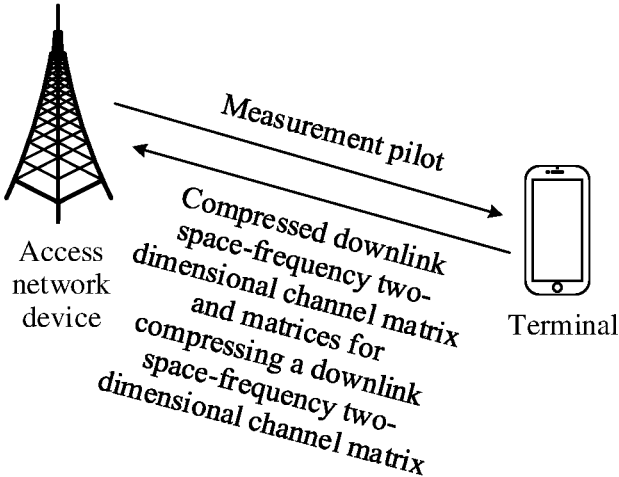

As shown in FIG. 5, in Embodiment 2, an access network device may not perform dimension reduction on a measurement pilot, but a terminal may compress an estimated downlink channel matrix (in the frequency domain and/or the space domain), and feed back, to the access network device, a compressed downlink channel matrix and matrices for compressing the downlink channel matrix, to reduce overheads for uplink feedback.

A time unit in embodiments of this application is a set including a plurality of consecutive orthogonal frequency division multiplexing (OFDM) symbols. For example, the time unit may be a minislot, a slot, a subframe, or a transmission time interval (TT). In the NR system, for a normal cyclic prefix (CP), one slot includes 14 OFDM symbols; for an extended CP, one slot includes 12 OFDM symbols. The time unit may also be referred to as a time domain unit, a time domain granularity, or the like.

A frequency domain unit in embodiments of this application may be a frequency domain width of one or more RBs. For example, the frequency domain unit may include a frequency domain width of x RBs. x may be any positive integer. For example, x may be 1, 2, 4, 8, or 16. The frequency domain unit may alternatively be one or more subcarriers. For example, the frequency domain unit may include y subcarriers. y may be any positive integer. For example, y may be 1, 12, 60, or 120. Alternatively, the frequency domain unit may be a predefined subband, a band, a bandwidth part (BWP), a component carrier (CC), or the like.

Embodiment 1

During specific implementation, Embodiment 1 may include the following scenario 1 (where an access network device performs only frequency-domain compression on a measurement pilot), scenario 2 (where an access network device performs frequency-domain compression and space-domain compression on a measurement pilot), and scenario 3 (where an access network device performs only space-domain compression on a measurement pilot). The signal sending method provided in Embodiment 1 is specifically described below in the three scenarios.

Scenario 1: The access network device performs only frequency-domain compression on the measurement pilot.

Figure 6:
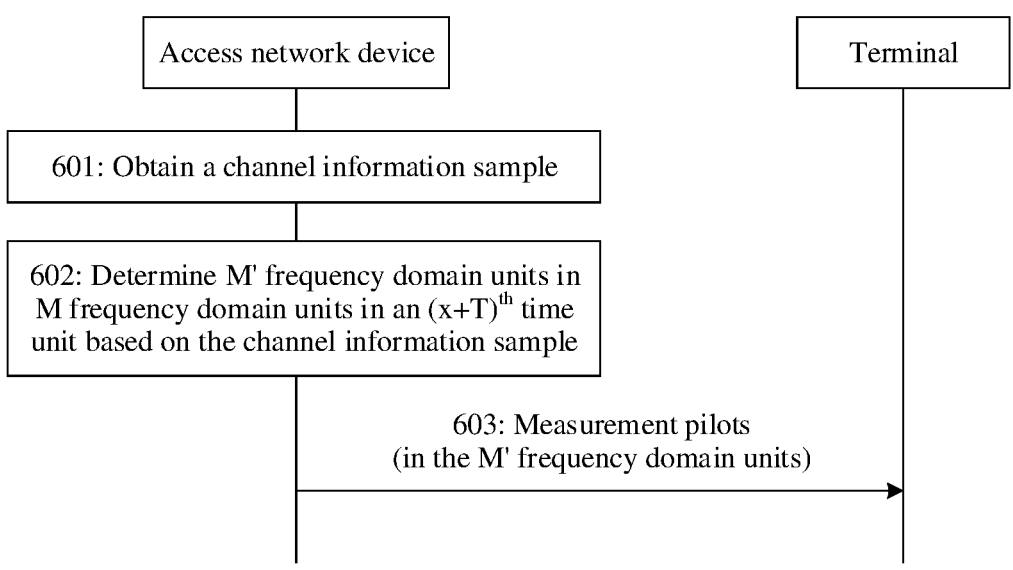
FIG. 6 is a flowchart of a signal sending method according to an embodiment of this application.

As shown in FIG. 6, in the scenario 1, the signal sending method provided in Embodiment 1 includes the following steps.

601: The access network device obtains a channel information sample. The channel information sample includes channel information in an $x^{th}$ time unit to an $(x+T-1)^{th}$ time unit, where both x and T are integers greater than or equal to 1.

It should be noted that a plurality of time units corresponding to the channel information in the channel information sample may be consecutive or non-consecutive. This is not limited in this application. However, in this application, consecutive time units are used as an example to describe the method provided in this embodiment of this application. The channel information sample may alternatively include channel information in another time unit instead of the channel information in the $x^{th}$ time unit to the $(x+T-1)^{th}$ time unit. This is not limited in this application.

For example, the channel information may include but is not limited to any one or more of the following information: an uplink channel matrix, a downlink channel matrix, CSI, a channel delay, channel multipath angle information, an uplink channel covariance matrix, or a downlink channel covariance matrix. The CSI includes but is not limited to any one or more of the following information: a precoding matrix indicator (PMI) or a rank indication (RI).

Figure 7:
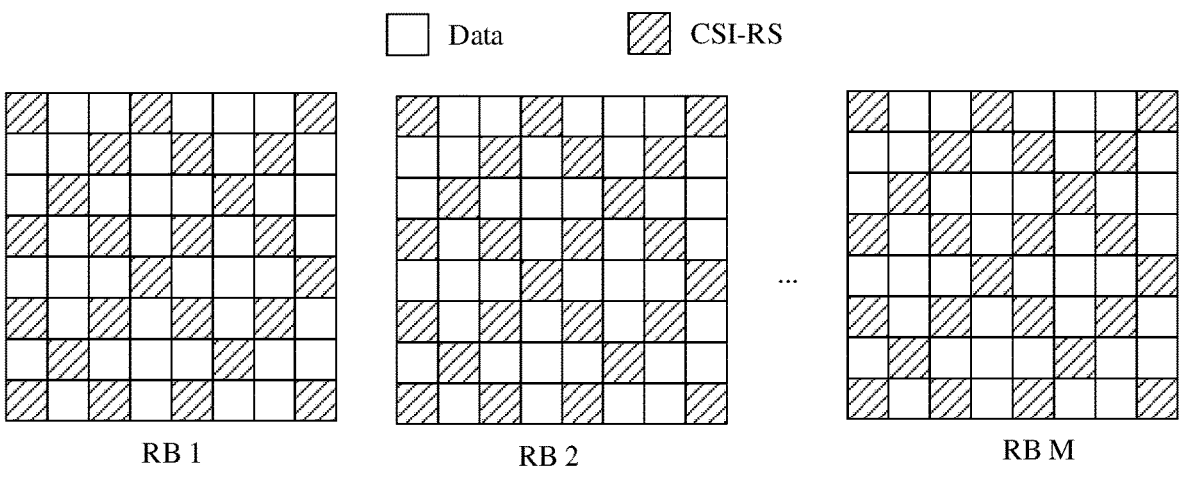
FIG. 7 is a schematic diagram of CSI-RS distribution on M RBs according to an embodiment of this application.

During specific implementation of step 601, using an example in which the channel information is an actually measured downlink channel matrix, if downlink channel matrices in T time units (namely, the $x^{th}$ time unit to the $(x+T-1)^{th}$ time unit) are recorded as $H_1$, $H_2$, . . . , $H_T$, for each frequency domain unit in an $s^{th}$ (where s is an integer greater than or equal to 1 and less than or equal to T) time unit in the T time units, the access network device sends measurement pilots by using a plurality of REs (for example, N different REs, where N is a quantity of ports of the access network device, and N ports may be a part of port resources of the access network device), to distinguish between different ports of the access network device. For example, the frequency domain unit is an RB. FIG. 7 is drawn by using an example in which measurement pilots are sent on each RB in the $s^{th}$ time unit in the T time units by using 24 different REs to distinguish between 24 different ports of the access network device. A terminal measures the measurement pilots on each RB to obtain a downlink channel matrix on each RB. If there are M RBs in each time unit, the terminal concatenates downlink channel matrices on the M RBs to obtain $H_s$. Then, the terminal may perform uplink feedback and recovery of $H_s$ by using the method in the background. An $m^{th}$ (where m is an integer greater than or equal to 1 and less than or equal to M) column in $H_s$ corresponds to an $m^{th}$ RB in the $s^{th}$ time unit in the T time units, and an $n^{th}$ (where n is an integer greater than or equal to 1 and less than or equal to N) row in $H_s$ corresponds to an $n^{th}$ port of the access network device in the $s^{th}$ time unit. M is a considered quantity of RBs in each time unit. The terminal in this embodiment of this application is a single-port or multi-port terminal.

A process in which the access network device obtains the channel information sample may be referred to as initialization.

602: The access network device determines M' frequency domain units in M frequency domain units in an $(x+T)^{th}$ time unit based on the channel information sample. The M' frequency domain units are used to send one or more measurement pilots, where both M' and M are integers greater than or equal to 1, and M'<M.

For example, the M frequency domain units are all frequency domain units in the time unit.

Optionally, the M' frequency domain units are determined by using a second matrix. The second matrix is used to perform frequency-domain compression on a second downlink channel matrix. The second downlink channel matrix is a downlink channel matrix in the $(x+T)^{th}$ time unit. It should be noted that the access network device does not need to actually determine the second downlink channel matrix. Therefore, the second downlink channel matrix may be considered as a downlink channel matrix that is in the $(x+T)^{th}$ time unit and that is predicted or estimated by the access network device.

The second matrix may be determined based on a first matrix, and the first matrix is used to sparsify the second downlink channel matrix in the $(x+T)^{th}$ time unit in the frequency domain. The first matrix may be determined based on the channel information sample.

603: The access network device sends the one or more measurement pilots to the terminal in the M' frequency domain units.

In the method shown in FIG. 6, the access network device may determine the M' frequency domain units in the M frequency domain units in the $(x+T)^{th}$ time unit to send the one or more measurement pilots, to implement frequency-domain dimension reduction of the one or more measurement pilots. Compared with a conventional technology in which one or more measurement pilots are sent in M frequency domain units, the method can reduce a quantity of frequency domain units for sending the one or more measurement pilots, and reduce overheads for sending the one or more measurement pilots, so that measurement pilot overheads for estimating a downlink channel matrix are reduced.

Figure 8:
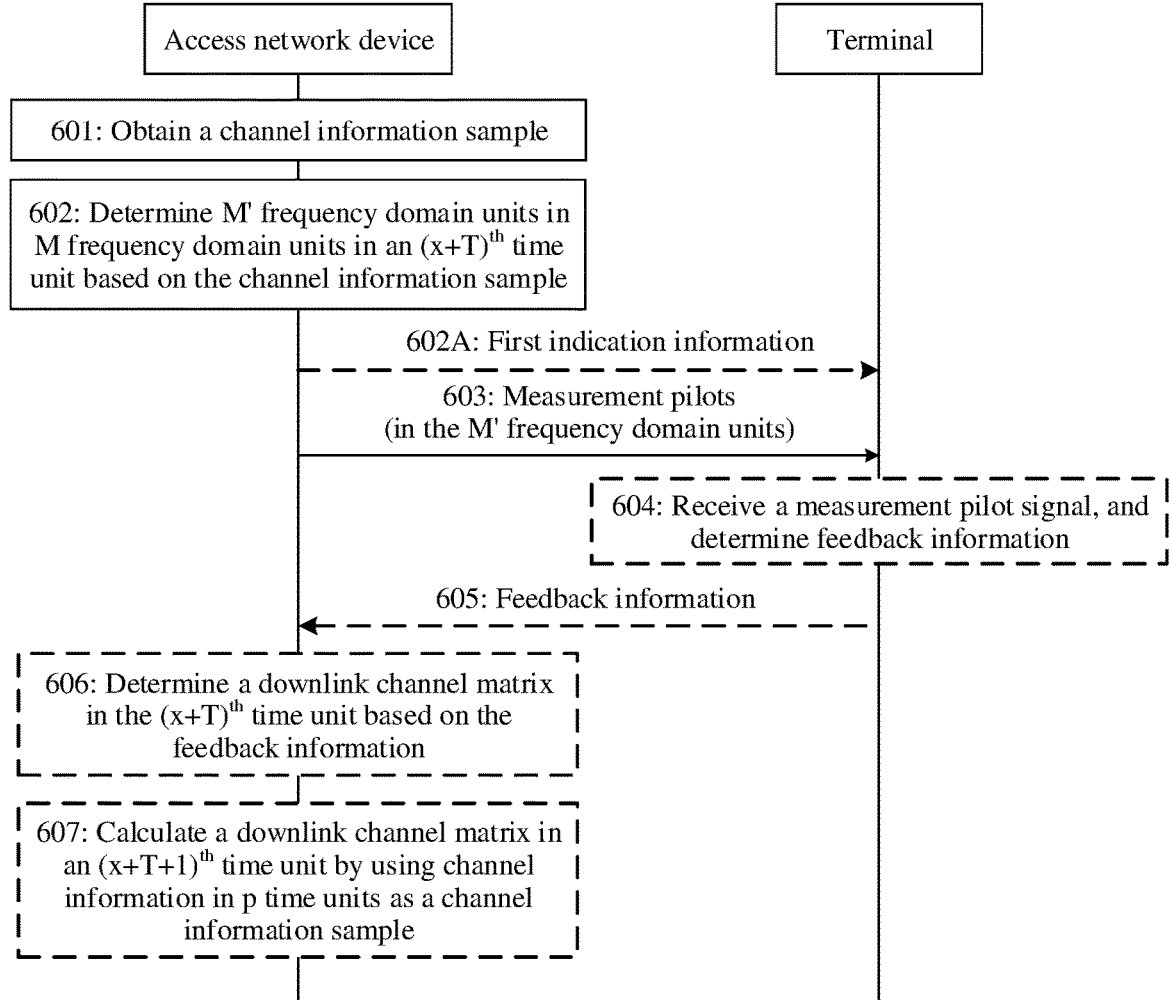

As shown in FIG. 8, the scenario 1, optionally, the method further includes the following steps.

604: The terminal receives a measurement pilot signal, and determines feedback information.

Specifically, the terminal receives the measurement pilot signal on a time-frequency resource used by the access network device to send the one or more measurement pilots.

The feedback information indicates information about the measurement pilot signal received by the terminal. For the $(x+T)^{th}$ time unit, the feedback information specifically indicates information about a measurement pilot signal received by the terminal in the $(x+T)^{th}$ time unit.

The measurement pilot signal received by the terminal includes N*M'*R elements, and each element represents the measurement pilot signal received on one of the N ports for sending the one or more measurement pilots, in one of the M' frequency domain units for sending the one or more measurement pilots, and on one of R ports for receiving the measurement pilot signal, where R, N, and M' are all integers greater than or equal to 1.

It may be understood that N indicates the quantity of ports used by the access network device to send the one or more measurement pilots, namely, the quantity of transmit ports for the one or more measurement pilots. M' indicates a quantity of frequency domain units occupied by the one or more measurement pilots. R indicates a quantity of ports used by the terminal to receive the measurement pilot signal, namely, a quantity of receive ports for the measurement pilot signal.

In a case, the feedback information specifically indicates amplitude information and phase information of each element in the measurement pilot signal received by the terminal. For example, the feedback information specifically indicates an absolute amplitude and an absolute phase of each element in the measurement pilot signal received by the terminal.

In another case, the measurement pilot signal received by the terminal includes a plurality of groups of elements, each group of elements includes more than one element, and the feedback information specifically indicates amplitude information and phase information of each group of elements. For example, the feedback information specifically indicates an absolute amplitude and an absolute phase of each group of elements.

605: The terminal sends the feedback information to the access network device. Correspondingly, the access network device receives the feedback information from the terminal.

606: The access network device determines a downlink channel matrix in the $(x+T)^{th}$ time unit based on the feedback information.

Optionally, during specific implementation of step 606, the access network device determines a third downlink channel matrix in the $(x+T)^{th}$ time unit based on the feedback information, the first matrix, and the second matrix. The third downlink channel matrix is an actually measured downlink channel matrix.

During the specific implementation of step 606, the access network device performs frequency-domain recovery based on the feedback information, the first matrix, and the second matrix, to obtain the third downlink channel matrix.

In the optional method, after measuring the one or more measurement pilots, the terminal does not perform channel estimation or compression and feedback, but directly feeds back, to the access network device, the feedback information indicating the information about the measurement pilot signal received by the terminal in the $(x+T)^{th}$ time unit, to reduce overheads for uplink feedback.

In the scenario 1, as shown in FIG. 8, optionally, before step 603, the method further includes the following step:

602A: The access network device sends first indication information to the terminal. The first indication information indicates location information of the M' frequency domain units. Correspondingly, the terminal receives the first indication information from the access network device, and the terminal may determine, based on the first indication information, the frequency domain units used by the access network device to send the one or more measurement pilots.

In this case, during specific implementation, step 604 includes: The terminal receives the measurement pilot signal in the M' frequency domain units in the $(x+T)^{th}$ time unit, and determines the feedback information.

Optionally, the first indication information is carried in radio resource control (RRC) signaling, media access control (MAC) control element (MAC CE) signaling, or downlink control information (DCI).

Optionally, the access network device sends the first indication information in the $(x+T)^{th}$ time unit. It should be noted that the location information of the M' frequency domain units may be indicated by the access network device by using the first indication information, or may be specified by the access network device and the terminal according to a communication protocol.

For example, the first indication information may indicate indexes of the M' frequency domain units. For example, if M'=4, and the indexes indicated by the first indication information are 0, 2, 4, and 8, it indicates that the access network device is to send the one or more measurement pilots in a frequency domain unit 0, a frequency domain unit 2, a frequency domain unit 4, and a frequency domain unit 8. A frequency domain unit i is a frequency domain unit whose index is i, where i is an integer greater than or equal to 0.

In the scenario 1, as shown in FIG. 8, optionally, the method further includes the following step:

607: The access network device calculates a downlink channel matrix in an $(x+T+1)^{th}$ time unit by using channel information in p time units as a channel information sample. p is an integer greater than or equal to 1 and less than or equal to x+T.

For example, the p time units may be p time units that are immediately followed by the $(x+T+1)^{th}$ time unit. Certainly, the p time units may alternatively be other time units, for example, the $x^{th}$ time unit to the $(x+T-1)^{th}$ time unit. This is not limited in this application.

Specific implementation of step 607 is similar to the process of determining the third downlink channel matrix in the $(x+T)^{th}$ time unit.

Scenario 2: The access network device performs frequency-domain compression and space-domain compression on the measurement pilot.

Figure 9:
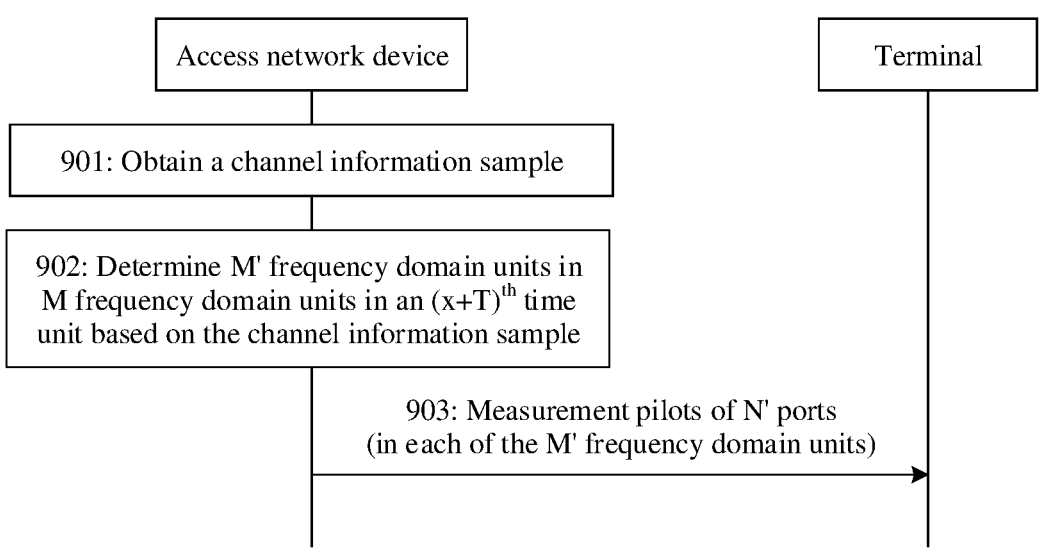

In the scenario 2, as shown in FIG. 9, the signal sending method provided in Embodiment 1 includes the following steps.

901: The access network device obtains a channel information sample. The channel information sample includes channel information in an $x^{th}$ time unit to an $(x+T-1)^{th}$ time unit, where both x and T are integers greater than or equal to 1.

For descriptions related to step 901, refer to step 601.

902: The access network device determines M' frequency domain units in M frequency domain units in an $(x+T)^{th}$ time unit based on the channel information sample. The M' frequency domain units are used to send one or more measurement pilots, where both M' and M are integers greater than or equal to 1, and M'<M.

For example, the M frequency domain units are all frequency domain units in the time unit.

Optionally, the M' frequency domain units are determined by using a second matrix. The second matrix is used to perform frequency-domain compression on a first downlink channel matrix. The first downlink channel matrix is obtained by performing space-domain compression on a second downlink channel matrix, and the second downlink channel matrix is a downlink channel matrix in the $(x+T)^{th}$ time unit. In this case, a method for performing space-domain compression on the second downlink channel matrix is not limited in this application.

It should be noted that the access network device does not need to actually determine the second downlink channel matrix. Therefore, the second downlink channel matrix may be considered as a downlink channel matrix that is in the $(x+T)^{th}$ time unit and that is predicted or estimated by the access network device.

The second matrix may be determined based on a first matrix, and the first matrix is used to sparsify the first downlink channel matrix in the $(x+T)^{th}$ time unit in the frequency domain. The first matrix may be determined based on the channel information sample. For example, the access network device determines a third matrix based on the channel information sample, determines a fourth matrix based on the third matrix, and then determines the first matrix based on the channel information sample and the fourth matrix. The third matrix is used to sparsify the second downlink channel matrix in the space domain. The fourth matrix is used to perform space-domain compression on the second downlink channel matrix, and the first downlink channel matrix is obtained by performing space-domain compression on the second downlink channel matrix by using the fourth matrix.

When the M' frequency domain units are determined in the M frequency domain units in the $(x+T)^{th}$ time unit by using the second matrix that is determined based on the first matrix determined in this example, a quantity of REs for sending the one or more measurement pilots in each of the M' frequency domain units can be reduced, to implement space-domain dimension reduction of the one or more measurement pilots, and further reduce overheads for sending the one or more measurement pilots, so that measurement pilot overheads for estimating a downlink channel matrix are further reduced.

903: The access network device sends one or more measurement pilots of N' ports to a terminal in each of the M' frequency domain units based on the channel information sample.

N' is an integer greater than or equal to 1, and N'<N. Optionally, the measurement pilot sent in each of the M' frequency domain units is a measurement pilot precoded by using the fourth matrix.

In the method shown in FIG. 9, the access network device may determine the M' frequency domain units in the M frequency domain units in the $(x+T)^{th}$ time unit, and send the one or more measurement pilots of the N' ports in each of the M' frequency domain units, to implement frequency-domain dimension reduction and the space-domain dimension reduction of the one or more measurement pilots. Compared with a conventional technology in which one or more measurement pilots are sent on M frequency domain units, the method can reduce, through the frequency-domain dimension reduction, both a quantity of frequency domain units for sending the measurement pilots and the overheads for sending the measurement pilots, so that the measurement pilot overheads for estimating the downlink channel matrix can be reduced. Through the space-domain dimension reduction, the quantity of REs for sending the measurement pilots in each of the M' frequency domain units can be reduced, to further reduce the overheads for sending the measurement pilots, so that the measurement pilot overheads for estimating the downlink channel matrix are further reduced.

Figures 10, 11:
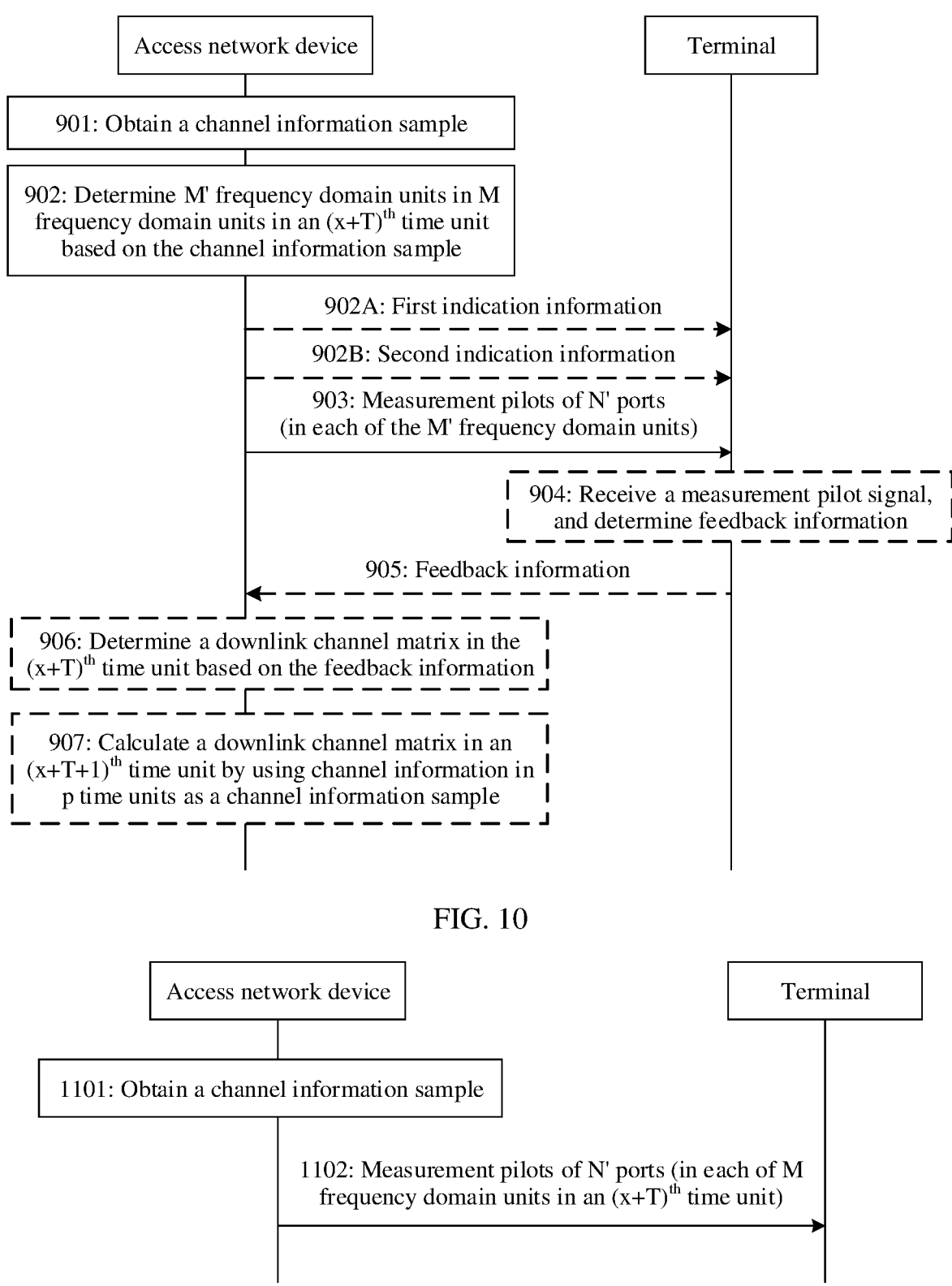

In the scenario 2, as shown in FIG. 10, optionally, the method further includes the following steps.

904: The terminal receives a measurement pilot signal, and determines feedback information.

The feedback information indicates information about the measurement pilot signal received by the terminal. For the $(x+T)^{th}$ time unit, the feedback information specifically indicates information about a measurement pilot signal received by the terminal in the $(x+T)^{th}$ time unit.

The measurement pilot signal received by the terminal includes N'\*M'\*R elements, and each element represents the measurement pilot signal received by the terminal on one of the N' ports for sending the one or more measurement pilots, in one of the M' frequency domain units for sending the one or more measurement pilots, and on one of R ports for receiving the measurement pilot signal, where R, N', and M' are all integers greater than or equal to 1.

It may be understood that N' indicates a quantity of ports used by the access network device to send the one or more measurement pilots, namely, a quantity of transmit ports for the one or more measurement pilots. M' indicates a quantity of frequency domain units occupied by the one or more measurement pilots. R indicates a quantity of ports used by the terminal to receive the measurement pilot signal, namely, a quantity of receive ports for the measurement pilot signal.

In a case, the feedback information specifically indicates amplitude information and phase information of each element in the measurement pilot signal received by the terminal. For example, the feedback information specifically indicates an absolute amplitude and an absolute phase of each element in the measurement pilot signal received by the terminal.

In another case, the measurement pilot signal received by the terminal includes a plurality of groups of elements, each group of elements includes more than one element, and the feedback information specifically indicates amplitude information and phase information of each group of elements. For example, the feedback information specifically indicates an absolute amplitude and an absolute phase of each group of elements.

905: The terminal sends the feedback information to the access network device. Correspondingly, the access network device receives the feedback information from the terminal.

906: The access network device determines a downlink channel matrix in the $(x+T)^{th}$ time unit based on the feedback information.

Optionally, during specific implementation of step 906, the access network device determines a third downlink channel matrix in the $(x+T)^{th}$ time unit based on the feedback information, the first matrix, the second matrix, the third matrix, and the fourth matrix. The third downlink channel matrix is an actually measured downlink channel matrix. Specifically, the access network device may perform frequency-domain recovery based on the feedback information, the first matrix, and the second matrix to obtain a space-domain compressed third downlink channel matrix, and then perform space-domain recovery based on the third matrix and the fourth matrix to obtain the third downlink channel matrix.

In the optional method, after measuring the one or more measurement pilots, the terminal does not perform channel estimation, but directly feeds back, to the access network device, the feedback information that is in the $(x+T)^{th}$ time unit and that indicates the information about the measurement pilot signal received by the terminal in the $(x+T)^{th}$ time unit, to reduce overheads for uplink feedback.

In the scenario 2, as shown in FIG. 10, optionally, before step 903, the method further includes the following steps:

902A: The access network device sends first indication information to the terminal. The first indication information indicates the M' frequency domain units. Correspondingly, the terminal receives the first indication information from the access network device, and the terminal may determine, based on the first indication information, the frequency domain units used by the access network device to send the one or more measurement pilots. For descriptions related to step 902A, refer to step 602A.

902B: The access network device sends second indication information to the terminal. The second indication information indicates a value of N'. Correspondingly, the terminal receives the second indication information from the access network device, and the terminal may determine, based on the second indication information, the quantity of ports used by the access network device to send the one or more measurement pilots.

In this case, during specific implementation, step 904 includes: The terminal receives the measurement pilot signal on the N' ports in each of the M' frequency domain units, and determines the feedback information.

For related descriptions of the first indication information, refer to the foregoing.

Optionally, the second indication information is carried in RRC signaling, MAC CE signaling, or DCI.

Optionally, the access network device sends the second indication information in the $(x+T)^{th}$ time unit. It should be noted that the value of N' may be indicated by the access network device by using the second indication information, or may be specified by the access network device and the terminal according to a communication protocol.

The first indication information and the second indication information may be carried in a same message, or may be carried in different messages. This is not limited in this application.

In the scenario 2, as shown in FIG. 10, optionally, the method further includes the following step:

907: The access network device calculates a downlink channel matrix in an $(x+T+1)^{th}$ time unit by using channel information in p time units as a channel information sample. p is an integer greater than or equal to 1 and less than or equal to x+T. For descriptions related to step 907, refer to step 607.

Scenario 3: The access network device performs only space-domain compression on the measurement pilot.

In the scenario 3, as shown in FIG. 11, the signal sending method provided in Embodiment 1 includes the following steps.

1101: The access network device obtains a channel information sample. The channel information sample includes channel information in an $x^{th}$ time unit to an $(x+T-1)^{th}$ time unit, where both x and T are integers greater than or equal to 1.

For descriptions related to step 1101, refer to step 601.

1102: The access network device sends one or more measurement pilots of N' ports to a terminal in each of M frequency domain units in an $(x+T)^{th}$ time unit based on the channel information sample.

During specific implementation, step 1102 may include: The access network device determines a third matrix based on the channel information sample, determines a fourth matrix based on the third matrix, precodes the measurement pilot in each of the M frequency domain units in the $(x+T)^{th}$ time unit by using the fourth matrix, and sends the precoded measurement pilot in each of the M frequency domain units. The third matrix is used to sparsify a second downlink channel matrix in the space domain. The fourth matrix is used to perform space-domain compression on the second downlink channel matrix. The second downlink channel matrix is a downlink channel matrix in the $(x+T)^{th}$ time unit.

It should be noted that the access network device does not need to actually determine the second downlink channel matrix. Therefore, the second downlink channel matrix may be considered as a downlink channel matrix that is in the $(x+T)^{th}$ time unit and that is predicted or estimated by the access network device.

Optionally, the measurement pilot sent in each of the M frequency domain units is the measurement pilot precoded by using the fourth matrix.

In the method shown in FIG. 11, the access network device can implement space-domain dimension reduction of the one or more measurement pilots, to reduce a quantity of REs for sending the one or more measurement pilots in each of the M frequency domain units, and reduce overheads for sending the one or more measurement pilots, so that measurement pilot overheads for estimating a downlink channel matrix are reduced.

In the scenario 3, as shown in FIG. 12, optionally, the method further includes the following steps.

1103: The terminal receives a measurement pilot signal on a time-frequency resource for sending the one or more measurement pilots, and determines feedback information.

The feedback information indicates information about the measurement pilot signal received by the terminal. For the $(x+T)^{th}$ time unit, the feedback information specifically indicates information about a measurement pilot signal received by the terminal in the $(x+T)^{th}$ time unit.

The measurement pilot signal received by the terminal includes N'*M*R elements, and each element represents the measurement pilot signal received by the terminal on one of the N' ports for sending the one or more measurement pilots, in one of the M frequency domain units for sending the one or more measurement pilots, and on one of R ports for receiving the measurement pilot signal, where R, N', and M are all integers greater than or equal to 1.

In a case, the feedback information specifically indicates amplitude information and phase information of each element in the measurement pilot signal received by the terminal. For example, the feedback information specifically indicates an absolute amplitude and an absolute phase of each element in the measurement pilot signal received by the terminal.

In another case, the measurement pilot signal received by the terminal includes a plurality of groups of elements, each group of elements includes more than one element, and the feedback information specifically indicates amplitude information and phase information of each group of elements. For example, the feedback information specifically indicates an absolute amplitude and an absolute phase of each group of elements.

1104: The terminal sends the feedback information to the access network device. Correspondingly, the access network device receives the feedback information from the terminal.

1105: The access network device determines a downlink channel matrix in the $(x+T)^{th}$ time unit based on the feedback information.

During specific implementation of step 1105, the access network device determines a third downlink channel matrix in the $(x+T)^{th}$ time unit based on the feedback information, the third matrix, and the fourth matrix. The third downlink channel matrix is an actually measured downlink channel matrix.

In the optional method, after measuring the one or more measurement pilots, the terminal does not perform channel estimation, but directly feeds back, to the access network device, the feedback information indicating the information about the measurement pilot signal received by the terminal in the $(x+T)^{th}$ time unit, to reduce overheads for uplink feedback.

Optionally, during the specific implementation, step 1105 includes: The access network device performs space-domain recovery based on the feedback information, the third matrix, and the fourth matrix, to obtain the third downlink channel matrix.

In the scenario 3, as shown in FIG. 12, optionally, before step 1102, the method further includes the following step:

1101A: The access network device sends second indication information to the terminal. The second indication information indicates a value of N'. Correspondingly, the terminal receives the second indication information from the access network device, and the terminal may determine, based on the second indication information, a quantity of ports used by the access network device to send the one or more measurement pilots.

In this case, during specific implementation, step 1103 includes: The terminal receives the measurement pilot signal on the N' ports in each of the M frequency domain units, and determines the feedback information.

In the scenario 3, as shown in FIG. 12, optionally, the method further includes the following step:

1106: The access network device calculates a downlink channel matrix in an $(x+T+1)^{th}$ time unit by using channel information in p time units as a channel information sample. p is an integer greater than or equal to 1 and less than or equal to x+T. For descriptions related to step 1106, refer to step 607.

In the foregoing three scenarios, the access network device may periodically update the matrices, may update the matrices when channel quality is poor, or may update the matrices in another case. This is not limited in this application.

The following uses the scenario 2 as an example to describe a method for determining each matrix. For ease of description, the following uses an example in which a downlink channel matrix in a time unit represents channel information in the time unit and the downlink channel matrix in each time unit is an N*M (where N is an integer greater than or equal to 1) matrix to describe the method for determining each matrix in the foregoing methods. Specifically, a case 1 (where each matrix is determined for all frequency domain units in the time unit) and a case 2 (where each matrix is separately determined for each frequency domain unit in the time unit) are used as examples for description.

Case 1: Each matrix is determined for all the frequency domain units in the time unit.

In the case 1, optionally, the third matrix satisfies a condition: An F-norm of a matrix difference between a product of the third matrix and a fifth matrix and a sixth matrix is the smallest.

The sixth matrix is an N*(M*T) matrix, column vectors in the sixth matrix include all column vectors in downlink channel matrices in the $x^{th}$ time unit to the $(x+T-1)^{th}$ time unit, column vectors in the fifth matrix correspond one-to-one to the column vectors in the sixth matrix, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N.

During determining of the third matrix, a plurality of candidate third matrices may be determined based on the fifth matrix, and a matrix that can minimize the foregoing F-norm in the plurality of candidate third matrices is the third matrix required in this application.

The sixth matrix is denoted as $\tilde{H}$. In this case, $\tilde{H}=[h_{1,1}, h_{2,1}, \ldots, h_{M,1}, h_{1,2}, h_{2,2}, \ldots, h_{M,2}, h_{1,3}, \ldots, h_{M,T}]$, where $h_{m,s}$ is an $m^{th}$ column in $H_s$.

The fifth matrix is denoted as X. In this case, $X=[x_{1,1}, x_{2,1}, \ldots, x_{M,1}, x_{1,2}, x_{2,2}, \ldots, x_{M,2}, x_{1,3}, \ldots, x_{M,T}]$, where $x_{m,s}$ is a sparse vector corresponding to $h_{m,s}$, and X satisfies "$\forall s, \forall m, \|x_{m,s}\|_0=S_1$". "$\forall s, \forall m, \|x_{m,s}\|_0=S_1$" indicates that for any value of s and m, a quantity of non-zero elements in $x_{m,s}$ is equal to $S_1$. $S_1$ may be predefined, preset, specified in a protocol, or determined by the access network device and the terminal through negotiation. This is not limited in this application.

The third matrix is denoted as $\Psi_D$. In this case, $$\Psi_D = \underset{\Psi}{\mathrm{argmin}}\left\|\tilde{H} - \Psi X\right\|_F^2. \qquad \text{(Formula 1.1)}$$

"$\left\|\tilde{H} - \Psi X\right\|_F^2$"

represents an F-norm of "$\tilde{H}-\Psi X$", and $\Psi$ is a feasible solution of $\Psi_D$. A solution algorithm for Formula 1.1 includes but is not limited to a typical K singular value decomposition (K singular value decomposition, KSVD) algorithm and the like. $\Psi_D$ and X may be obtained by solving Formula 1.1. It can be learned from Formula 1.1 that $\Psi_D$ is mainly intended to sparsify each column $h_{m,s}$ in $\tilde{H}$, namely, $h_{m,s}=\Psi_D x_{m,s}$.

As shown in FIG. 13, for example, assuming that $S_1=2$, $h_{m,s}$ may be sparsified as $x_{m,s}$ by using $\Psi_D$.

In the case 1, optionally, the fourth matrix satisfies a condition: Column coherence of a matrix (which may be denoted as a seventh matrix) obtained by multiplying the fourth matrix by the third matrix is the smallest.

Column coherence of a matrix is a largest value among modulus values obtained by performing an inner product operation on every two columns in the matrix.

During determining of the fourth matrix, a plurality of fourth matrices may be obtained for the third matrix, and a fourth matrix that can minimize the column coherence of the seventh matrix is the fourth matrix required in this application.

The fourth matrix is denoted as $\Phi_D$ In this case, the seventh matrix is $\Phi_D * \Psi_D$.

For example, based on an incoherence characteristic in a compressed sensing theory, when $\Phi_D$ satisfies Formula 1.2 below, the column coherence of the seventh matrix may be made as small as possible.

$$\Phi_D = \underset{\Phi}{\mathrm{argmin}}\left\|I - \Psi_D^H \Phi^H \Phi \Psi_D\right\|_F^2 \qquad \text{(Formula 1.2)}$$

I is a unit matrix,

"$\left\|I - \Psi_D^H \Phi^H \Phi \Psi_D\right\|_F^2$"

represents an F-norm of

"$I - \Psi_D^H \Phi^H \Phi \Psi_D$", and $\Phi$ is a feasible solution of $$\Phi_D . \Psi_D^H$$

is a conjugate transposition matrix of $\Psi_D$, and $\Phi^H$ is a conjugate transposition matrix of $\Phi$.

A solution algorithm for Formula 1.2 includes but is not limited to a typical principal component elimination algorithm and the like. $\Phi_D$ is mainly intended to compress each column $h_{m,s}$ in $\tilde{H}$ to obtain an N'*1-dimensional (where N'<<N, and "<<" indicates "far less than") observation vector $y_{m,s}$. $y_{m,s}=\Phi_D h_{m,s}=\Phi_D \Psi_D x_{m,s}$.

Figure 14:
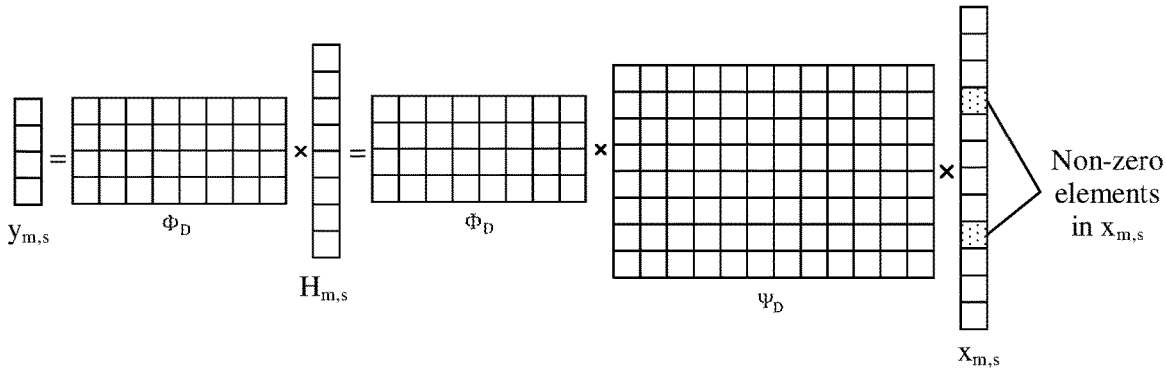
FIG. 14 is a schematic diagram of space-domain compression according to an embodiment of this application.

As shown in FIG. 14, for example, $h_{m,s}$, with eight rows may be compressed into four rows by using $\Phi_D$.

Formula 1.2 may be used to ensure that the sparse vector x, can be accurately recovered from the observation vector $y_{m,s}$ to obtain accurate $h_{m,s}=\Psi_D x_{m,s}$.

In the case 1, optionally, the first matrix satisfies a condition: An F-norm of a matrix difference between a product of the first matrix and an eighth matrix and a conjugate transposition matrix of a ninth matrix is the smallest.

The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ downlink channel matrix and the fourth matrix, and the $s^{th}$ downlink channel matrix is a downlink channel matrix in an $(x+s-1)^{th}$ time unit in the $x^{th}$ time unit to the $(x+T-1)^{th}$ time unit, where m is an integer greater than or equal to 1 and less than or equal to M, and s is an integer greater than or equal to 1 and less than or equal to T.

Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer less than M.

During determining of the first matrix, a plurality of candidate first matrices may be determined based on the eighth matrix, and a matrix that can minimize the foregoing F-norm in the plurality of candidate first matrices is the first matrix required in this application.

The conjugate transposition matrix of the ninth matrix is denoted as Y. In this case, $$Y = \begin{bmatrix} y_{1,1} & y_{2,1} & \cdots & y_{M,1} \\ y_{1,2} & y_{2,2} & \cdots & y_{M,2} \\ \vdots & \vdots & \ddots & \vdots \\ y_{1,T} & y_{2,T} & \cdots & y_{M,T} \end{bmatrix}^H = \begin{bmatrix} (\Phi_D h_{1,1})^H & (\Phi_D h_{1,2})^H & \cdots & (\Phi_D h_{1,T})^H \\ (\Phi_D h_{2,1})^H & (\Phi_D h_{2,2})^H & \cdots & (\Phi_D h_{2,T})^H \\ \vdots & \vdots & \ddots & \vdots \\ (\Phi_D h_{M,1})^H & (\Phi_D h_{M,2})^H & \cdots & (\Phi_D h_{M,T})^H \end{bmatrix}.$$

It may be understood that Y is an M*N'T-dimensional matrix, and each row in Y corresponds to one frequency domain unit.

The eighth matrix is denoted as W. In this case, $W=[w_1, w_2, \ldots, w_{N'T}]$, where $w_k$ is a sparse representation of a $k^{th}$ column vector in Y, and k is an integer greater than or equal to 1 and less than or equal to N'T. W satisfies "$\forall k, \|w_k\|_0=S_2$", where "$\forall k, \|w_k\|_0=S_2$" indicates that for any value of k, a quantity of non-zero elements in $w_k$ is equal to $S_2$.

The first matrix is denoted as $\Psi_f$. In this case, when $\Psi_f$ satisfies Formula 1.3 below, an F-norm of a matrix difference between a product of $\Psi_f$ and W and Y may be the smallest.

$$\Psi_f = \underset{\Psi}{\mathrm{argmin}} \|Y - \Psi W\|_F^2 \qquad \text{(Formula 1.3)}$$

$$\text{``} \|Y - \Psi W\|_F^2\text{''}$$

represents an F-norm of "Y−ΨW", and Ψ is a feasible solution of $\Psi_f$. A solution algorithm for Formula 1.3 includes but is not limited to the typical KSVD algorithm and the like. $\Psi_f$ is mainly intended to sparsify each column in Y.

In the case 1, optionally, the second matrix satisfies a condition: Column coherence of a matrix obtained by multiplying the second matrix by the first matrix is the smallest. The second matrix is a row-extracted matrix, each row in the second matrix has only one non-zero element, and non-zero elements in different rows are in different locations.

During determining of the second matrix, a plurality of row-extracted matrices may be obtained for the first matrix, and are multiplied by the first matrix to obtain a plurality of matrices, and a row-extracted matrix that can minimize column coherence of the plurality of matrices is the second matrix required in this application.

The second matrix is denoted as $\Phi_f$. In this case, $$\Phi_f = \underset{\Phi}{\mathrm{argmin}} \|I - \Psi_f^H \Phi^H \Phi \Psi_f\|_F^2$$

(Formula 1.4), where $\Phi_f$ satisfies "$\forall i, \|\varphi_i\|_0=1, \mathrm{Rank}(\Phi)=M'$". "$\forall i, \|\varphi_i\|_0=1, \mathrm{Rank}(\Phi)=M'$" limits $\Phi_f$ to a row-extracted matrix for $\Psi_f$, and specifically indicates that for any value of i, a quantity of non-zero elements in $\varphi_i$ is 1, and a rank of $\Phi$ is M'. $\varphi_i$ indicates an $i^{th}$ row in $\Phi_f$, non-zero elements in rows in $\Phi_f$ are in different locations, i is an integer greater than or equal to 1 and less than or equal to M', and M'<<M. I is a unit matrix, $$\text{``}\|I - \Psi_f^H \Phi^H \Phi \Psi_f\|_F^2\text{''}$$

represents an F-norm of $$\text{``}I - \Psi_f^H \Phi^H \Phi \Psi_f\text{''},$$

and Φ is a feasible solution of $\Phi_f$.

Formula 1.4 is intended to make column coherence of $\Phi_f \Psi_f$ as small as possible, to ensure that a sparse vector can still be recovered from a compressed vector.

It should be noted that Formula 1.4 is a combinatorial number problem, and is difficult to be efficiently solved. In view of this, this application provides a greedy search algorithm to obtain a quasi-optimal solution with low complexity. Specifically, a row in $\Psi_f$ is first extracted. Using the first row as an example, a row extraction set is set to $U=\{p_1\}$. Then, a remaining row in $\Psi_f$ is searched, to select a row that minimizes a cost function in Formula 1.4. Assuming that the selected row is the second row, U is updated to $U=\{p_1, p_2\}$. The foregoing process is repeated for M'−1 times, to obtain a complete row extraction set $U=\{p_1, p_2, \ldots, p_{M'}\}$. It should be noted that a location of each element in U is not limited in this application. $p_{m'}$ refers to a column that includes a non-zero element and that corresponds to an m'$^{th}$ row in $\Phi_f$, where m' is an integer greater than or equal to 1 and less than or equal to M'. Quasi-optimal $\Phi_f$ can be obtained based on U. For example, if M=5, M'=3, and $U=\{p_1=4, p_2=3, p_3=1\}$, the fourth column in the first row in $\Phi_f$ is a non-zero element, the third column in the second row is a non-zero element, and the first column in the third row is a non-zero element. Assuming that the non-zero element is 1, $$\Phi_f = \begin{bmatrix} 00010 \\ 00100 \\ 10000 \end{bmatrix}.$$

In the case 1, during specific implementation of step 902, the access network device selects, based on $\Phi_f$ (or equivalent M'), the M' frequency domain units in the $(x+T)^{th}$ time unit to send the one or more measurement pilots, to implement the frequency-domain dimension reduction, and subsequently notifies the terminal of M' by using the first indication information. Specifically, the M' frequency domain units are determined based on the locations of the non-0 elements in the second matrix.

Figure 15:
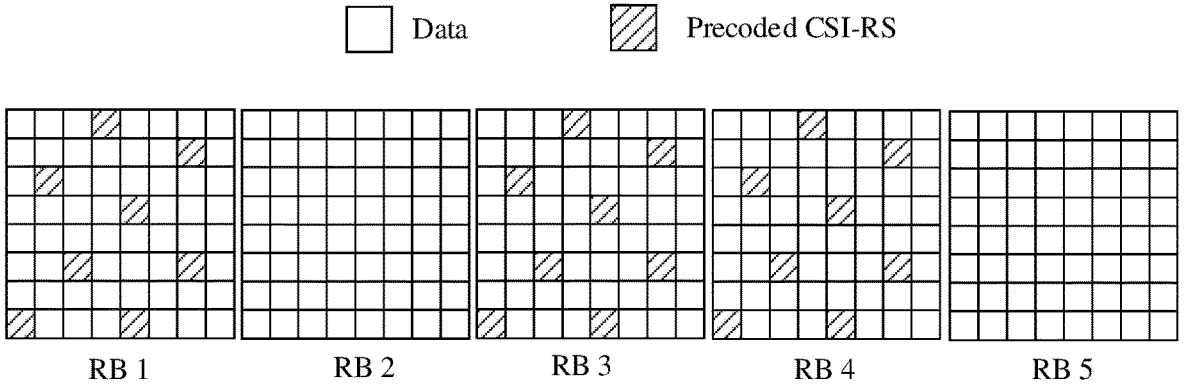
FIG. 15 is a schematic diagram of CSI-RS distribution formed after space-domain compression and frequency-domain compression are performed according to an embodiment of this application.

For example, the frequency domain unit is the RB. As shown in FIG. 15, if $$\Phi_f = \begin{bmatrix} 00010 \\ 00100 \\ 10000 \end{bmatrix},$$

the access network device may select three RBs from five RBs to send one or more measurement pilots, where the three RBs are an RB 1, an RB 3, and an RB 4, to reduce the overheads for sending the one or more measurement pilots.

In the case 1, optionally, during specific implementation, step 903 includes the following steps:

(21) The access network device precodes the measurement pilot in each of the M' frequency domain units by using the fourth matrix.

(22) The access network device sends the precoded measurement pilot in each of the M' frequency domain units.

Refer to the RB 1, the RB 3, and the RB 4 in FIG. 15. For example, the one or more measurement pilots on the RB 1, the RB 3, and the RB 4 are precoded, so that quantities of REs for sending the one or more measurement pilots on the RB 1, the RB 3, and the RB 4 can be reduced, thereby further reducing the overheads for sending the one or more measurement pilots. It may be understood that the space-frequency dimension-reduced measurement pilots sent by the access network device have a new measurement pilot pattern.

In step (21), it is assumed that a precoding vector for an $n'^{th}$ measurement pilot sent by the access network device in each of the M' frequency domain units is $f_{D,n'}$, and $f_{D,n'}$ is an $n'^{th}$ row in $\Phi_D$. In this case, after N'*M' measurement pilots in the extracted M' frequency domain units are all sent, an N'*M'-dimensional measurement signal obtained by the terminal may be expressed as:

$$Z_{x+T} = \Phi_f[\Phi_D h_{1,x+T}, \Phi_D h_{2,x+T}, \ldots, \Phi_D h_{M,x+T}]^H + N \quad \text{(Formula 1.5)}$$

$$= \Phi_f V_{x+T} + N$$

$h_{m,x+T}$ represents a channel vector in an $m^{th}$ frequency domain unit in the $(x+T)^{th}$ time unit, and N is a noise matrix.

In this case, during specific implementation of step 905, the terminal may not perform channel estimation, but directly quantize $Z_{x+T}$ to obtain $\overline{Z}_{x+T}$ (namely, the feedback information), and feed back $\overline{Z}_{x+T}$ to the access network device.

Certainly, step 905 may alternatively be implemented in another manner. For example, the terminal may find, from a codebook, a codeword closest to $Z_{x+T}$ (that is, an F-norm of a difference between the codeword and $Z_{x+T}$ is the smallest), and then feed back a sequence number of the codeword to the access network device. For another example, the terminal may feed back, to the access network device, an amplitude and a phase of an element (for example, an element with a largest amplitude and a largest phase) in $Z_{x+T}$ and an amplitude and a phase of another element relative to the element. This is not specifically limited in this application.

Figure 16:
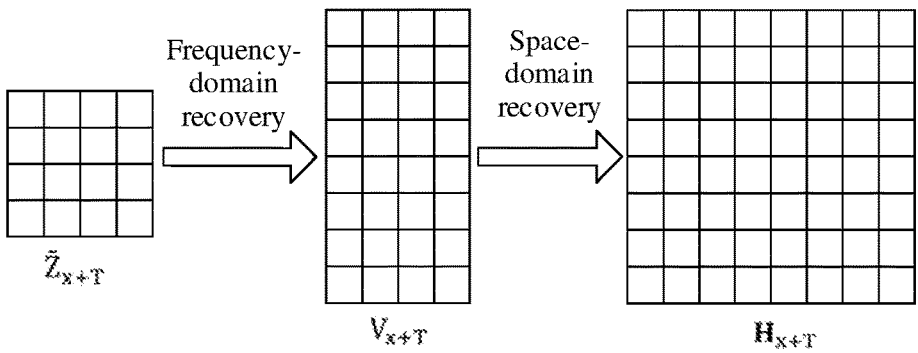
FIG. 16 is a schematic diagram of space-domain recovery and frequency-domain recovery according to an embodiment of this application.

Optionally, during specific implementation, step 906 includes: After receiving $\overline{Z}_{x+T}$, the access network device may obtain an N*M-dimensional space-frequency downlink channel matrix $H_{x+T}$ through the frequency-domain recovery and the space-domain recovery. As shown in FIG. 16, $V_{x+T}$ and Y are similar in forms. If a downlink channel has a slow-varying characteristic in time domain, $V_{x+T}$ may still be sparsified by using $\Psi_f$. Therefore, $V_{x+T}=[\Phi_D h_{1,x+T}\Phi_D h_{2,x+T}, \ldots, \Phi_D h_{M,x+T}]^H$ maybe recovered based on $\overline{Z}_{x+T}$ by using atypical sparse signal reconstruction algorithm, for example, an orthogonal matching pursuit (OMP) algorithm. Then, similarly, $h_{m,x+T}$ may still be sparsified by using $\Psi_D$ based on the slow-varying characteristic of the downlink channel in time domain. Therefore, $h_{m,x+T}$ may be recovered based on $\Phi_D h_{m,x+T}$ by using the typical sparse signal reconstruction algorithm, for example, the OMP algorithm. Finally, a high-dimensional downlink channel matrix $H_{x+T}=$ $[h_{1,x+T}, h_{2,x+T}, \ldots, h_{M,x+T}]$ may be obtained.

Case 2: Each matrix is separately determined for each frequency domain unit in the time unit.

In the case 2, optionally, the third matrix includes M third submatrices, and an $m^{th}$ third submatrix in the M third submatrices satisfies a condition: An F-norm of a matrix difference between a product of the $m^{th}$ third submatrix and an $m^{th}$ fifth submatrix and an $m^{th}$ sixth submatrix is the smallest, where m is an integer greater than or equal to 1 and less than or equal to M.

The $m^{th}$ sixth submatrix is an N*T matrix, column vectors in the $m^{th}$ sixth submatrix include $m^{th}$ column vectors in downlink channel matrices in the $x^{th}$ time unit to the $(x+T-1)^{th}$ time unit, column vectors in the $m^{th}$ fifth submatrix correspond one-to-one to the column vectors in the $m^{th}$ sixth submatrix, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than N.

During determining of the $m^{th}$ third submatrix, a plurality of candidate $m^{th}$ third submatrices may be determined based on the $m^{th}$ fifth submatrix, and a matrix that can minimize the foregoing F-norm in the plurality of candidate $m^{th}$ third submatrices is the $m^{th}$ third submatrix required in this application.

The $m^{th}$ sixth submatrix is denoted as $\tilde{H}_m$. In this case, $\tilde{H}_m=[h_{m,1}, h_{m,2}, \ldots, h_{m,T}]$, where $h_{m,s}$ is an $m^{th}$ column in $H_s$.

The $m^{th}$ fifth submatrix is denoted as $X_m$. In this case, $X_m=[x_{m,1}, x_{m,2}, \ldots, x_{m,T}]$, where $x_{m,s}$ is a sparse vector corresponding to $h_{m,s}$, and $X_m$ satisfies "$\forall s, \|x_{m,s}\|_0=S_1$". "$\forall s, \|x_{m,s}\|_0=S_1$" indicates that for any value of s, a quantity of non-zero elements in $x_{m,s}$ is equal to $S_1$. $S_1$ may be predefined, preset, specified in a protocol, or determined by the access network device and the terminal through negotiation. This is not limited in this application.

The $m^{th}$ third submatrix is denoted as $\Psi_m$. In this case, $$\Psi_m = \underset{\Psi}{\arg\min}\left\|\tilde{H}_m - \Psi X_m\right\|_F^2. \quad \text{(Formula 2.1)}$$

$$"\left\|\tilde{H}_m - \Psi X_m\right\|_F^2"$$

represents an F-norm of "$\tilde{H}_m - \Psi X_m$", and $\Psi$ is a feasible solution of $\Psi_m$. A solution algorithm for Formula 2.1 includes but is not limited to a typical KSVD algorithm and the like. $\Psi_m$ and $X_m$ may be obtained by solving Formula 2.1. It can be learned from Formula 2.1 that $\Psi_m$ is mainly intended to sparsify each column $h_{m,s}$ in $\tilde{H}_m$, namely, $h_{m,s}=\Psi_m x_{m,s}$.

Figure 17:
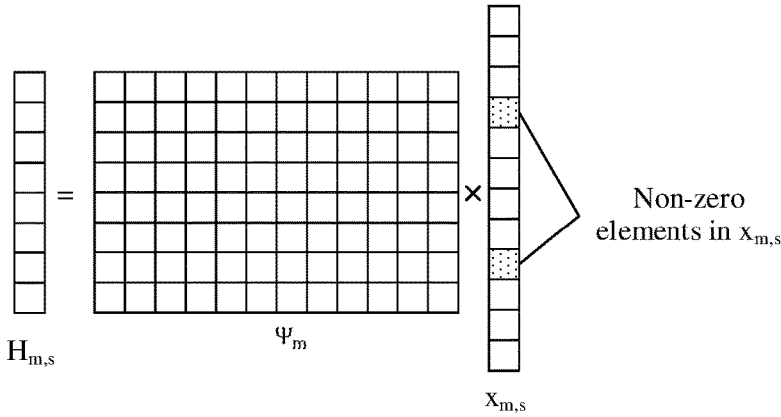
FIG. 17 is a schematic diagram of a sparse representation in the frequency domain according to an embodiment of this application.

As shown in FIG. 17, for example, assuming that $S_1=2$, $h_{m,s}$ may be sparsified as $x_{m,s}$ by using $\Psi_m$.

In the case 2, optionally, the fourth matrix includes M fourth submatrices, and an $m'^{th}$ fourth submatrix in the M fourth submatrices satisfies a condition: Column coherence of an $m'^{th}$ seventh submatrix obtained by multiplying the $m'^{th}$ fourth submatrix by the $m'^{th}$ third submatrix in the third matrix is the smallest. m' is an integer greater than or equal to 1 and less than or equal to M'. The fourth matrix includes the M fourth submatrices corresponding one-to-one to the M frequency domain units. In this case, a measurement pilot sent in an $m'^{th}$ frequency domain unit in the M' frequency domain units is a measurement pilot precoded by using an $m'^{th}$ fourth submatrix in M' fourth submatrices in the fourth matrix, and the M' fourth submatrices are fourth submatrices corresponding to the M' frequency domain units.

Column coherence of a matrix is a largest value among modulus values obtained by performing an inner product operation on every two columns in the matrix.

The $m'^{th}$ fourth submatrix is denoted as $\Phi_m$. In this case, the $m'^{th}$ seventh submatrix is $\Phi_m*\Psi_m$.

For example, based on an incoherence characteristic in a compressed sensing theory, when $\Phi_m$ satisfies Formula 2.2 below, the column coherence of the $m'^{th}$ seventh submatrix may be made as small as possible.

$$\Phi_m = \underset{\Phi}{\operatorname{argmin}} \left\| I - \Psi_m^H \Phi^H \Phi \Psi_m \right\|_F^2 \qquad \text{(Formula 2.2)}$$

I is a unit matrix, $$\text{``} \left\| I - \Psi_m^H \Phi^H \Phi \Psi_m \right\|_F^2 \text{''}$$

represents an F-norm of $$\text{``} I - \Psi_m^H \Phi^H \Phi \Psi_m \text{''},$$

and $\Phi$ is a feasible solution of $$\Phi_m \cdot \Psi_m^H$$

is a conjugate transposition matrix of $\Psi_m$, and $\Phi^H$ is a conjugate transposition matrix of $\Phi$.

A solution algorithm for Formula 2.2 includes but is not limited to a typical principal component elimination algorithm and the like. $\Phi_m$ is mainly intended to compress each column $h_{m,s}$ in $\tilde{H}_m$ to obtain an $N'*1$-dimensional (where $N'<<N$, and "$<<$" indicates "far less than") observation vector $y_{m,s}$. $y_{m,s} = \Phi_m h_{m,s} = \Phi_m \Psi_m x_{m,s}$.

Figure 18:
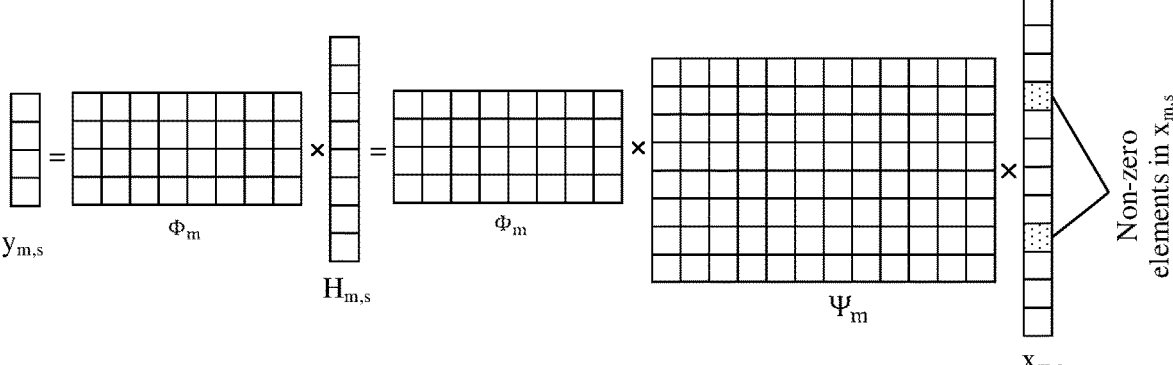
FIG. 18 is a schematic diagram of frequency-domain compression according to an embodiment of this application.

As shown in FIG. 18, for example, $h_{m,s}$ with eight rows may be compressed into four rows by using $\Phi_m$.

Formula 2.2 may be used to ensure that the sparse vector $x_{m,s}$ can be accurately recovered from the observation vector $y_{m,s}$, to obtain accurate $h_{m,s} = \Psi_m x_{m,s}$.

In the case 2, optionally, the first matrix satisfies a condition: An F-norm of a matrix difference between a product of the first matrix and an eighth matrix and a conjugate transposition matrix of a ninth matrix is the smallest.

The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ downlink channel matrix and the $m^{th}$ fourth submatrix, and the $s^{th}$ downlink channel matrix is a downlink channel matrix in an $(x+s-1)^{th}$ time unit in the $x^{th}$ time unit to the $(x+T-1)^{th}$ time unit, where s is an integer greater than or equal to 1 and less than or equal to T.

Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

During determining of the first matrix, a plurality of candidate first matrices may be determined based on the eighth matrix, and a matrix that can minimize the foregoing F-norm in the plurality of candidate first matrices is the first matrix required in this application.

The conjugate transposition matrix of the ninth matrix is denoted as Y. In this case, $$Y = \begin{bmatrix} y_{1,1} & y_{2,1} & \cdots & y_{M,1} \\ y_{1,2} & y_{2,2} & \cdots & y_{M,2} \\ \vdots & \vdots & \ddots & \vdots \\ y_{1,T} & y_{2,T} & \cdots & y_{M,T} \end{bmatrix} = \begin{bmatrix} (\Phi_1 h_{1,1})^H & (\Phi_1 h_{1,2})^H & \cdots & (\Phi_1 h_{1,T})^H \\ (\Phi_2 h_{2,1})^H & (\Phi_2 h_{2,2})^H & \cdots & (\Phi_2 h_{2,T})^H \\ \vdots & \vdots & \ddots & \vdots \\ (\Phi_M h_{M,1})^H & (\Phi_M h_{M,2})^H & \cdots & (\Phi_M h_{M,T})^H \end{bmatrix}$$

It may be understood that Y is an M*N'T-dimensional matrix, and each row in Y corresponds to one frequency domain unit.

The eighth matrix is denoted as W. In this case, $W=[w_1, w_2, \ldots, w_{N'T}]$, where $w_k$ is a sparse representation of a $k^{th}$ column vector in Y, and k is an integer greater than or equal to 1 and less than or equal to N'T. W satisfies "$\forall k$, $\|w_k\|_0 = S_2$", where "$\forall k$, $\|w_k\|_0 = S_2$" indicates that for any value of k, a quantity of non-zero elements in $w_k$ is equal to $S_2$.

The first matrix is denoted as $\Psi_f$. In this case, when $\Psi_f$ satisfies Formula 2.3 below, an F-norm of a matrix difference between a product of $\Psi_f$ and W and Y may be the smallest.

$$\Psi_f = \underset{\Psi}{\operatorname{argmin}} \| Y - \Psi W \|_F^2 \qquad \text{(Formula 2.3)}$$

$$\text{``} \| Y - \Psi W \|_F^2 \text{''}$$

represents an F-norm of "$Y-\Psi W$", and $\Psi$ is a feasible solution of $\Psi_f$. A solution algorithm for Formula 2.3 includes but is not limited to the typical KSVD algorithm and the like. $\Psi_f$ is mainly intended to sparsify each column in Y.

In the case 2, optionally, the second matrix satisfies a condition: Column coherence of a matrix obtained by multiplying the second matrix by the first matrix is the smallest. The second matrix is a row-extracted matrix, each row in the second matrix has only one non-zero element, and non-zero elements in different rows are in different locations.

A method for determining the second matrix in the case 2 is the same as that in the case 1. For details, refer to the foregoing descriptions.

In the case 2, specific implementation of step 902 is the same as that in the case 1.

In the case 2, optionally, during specific implementation, step 903 includes the following steps:

(31) The access network device precodes a measurement pilot in the $m'^{th}$ frequency domain unit in the M' frequency domain units by using the $m'^{th}$ fourth submatrix (denoted as $\Phi_{m'}$ below) in the M' fourth submatrices in the fourth matrix, to implement the space-domain dimension reduction, where the M' fourth submatrices are the fourth submatrices corresponding to the M' frequency domain units.

(32) The access network device sends the precoded measurement pilot in each of the M' frequency domain units.

Refer to the RB 1, the RB 3, and the RB 4 in FIG. 15. For example, the measurement pilots on the RB 1, the RB 3, and the RB 4 are precoded, so that quantities of REs for sending the measurement pilots on the RB 1, the RB 3, and the RB 4 can be reduced, thereby further reducing the overheads for sending the measurement pilots. It may be understood that the space-frequency dimension-reduced measurement pilots sent by the access network device have a new measurement pilot pattern.

In step (31), it is assumed that a precoding vector for an $n'^{th}$ measurement pilot sent by the access network device in the $m'^{th}$ frequency domain unit in the M' frequency domain units is $f_{m',n'}$, and $f_{m',n'}$ is an $n'^{th}$ row in $\Phi_{m'}$. In this case, after N'*M' measurement pilots in the extracted M' frequency domain units are all sent, an N'*M'-dimensional measurement signal obtained by the terminal may be expressed as:

$$Z_{x+T} = \Phi_f[\Phi_1 h_{1,x+T}, \Phi_2 h_{2,x+T}, \ldots, \Phi_M h_{M,x+T}]^H + N \quad \text{(Formula 2.5)}$$

$$= \Phi_f V_{x+T} + N$$

$h_{m,x+T}$ represents a channel vector in an $m^{th}$ frequency domain unit in the $(x+T)^{th}$ time unit, and N is a noise matrix.

In this case, during specific implementation of step 905, the terminal does not perform channel estimation, but directly quantizes $Z_{x+T}$ to obtain $\overline{Z}_{x+T}$ (namely, the feedback information), and feeds back $\overline{Z}_{x+T}$ to the access network device.

Certainly, step 905 may alternatively be implemented in another manner. For example, the terminal may find, from a codebook, a codeword closest to $Z_{x+T}$ (that is, an F-norm of a difference between the codeword and $Z_{x+T}$ is the smallest), and then feed back a sequence number of the codeword to the access network device. For another example, the terminal may feed back, to the access network device, an amplitude and a phase of an element (for example, an element with a largest amplitude and a largest phase) in $Z_{x+T}$ and an amplitude and a phase of another element relative to the element. This is not specifically limited in this application. Optionally, during specific implementation, step 906 includes: After receiving $\overline{Z}_{x+T}$, the access network device may obtain an N×M-dimensional space-frequency two-dimensional downlink channel matrix $H_{x+T}$ through the frequency-domain recovery and the space-domain recovery. As shown in FIG. 16, $V_{x+T}$ and Y are similar in forms. If a downlink channel has a slow-varying characteristic in time domain, $V_{x+T}$ may still be sparsified by using $\Psi_f$. Therefore, $V_{x+T}=[\Phi_1 h_{1,x+T}, \Phi_2 h_{2,x+T}, \ldots, \Phi_M h_{M,x+T}]H$ may be recovered based on $\overline{Z}_{x+T}$ by using a typical sparse signal reconstruction algorithm, for example, an OMP algorithm. Then, similarly, $h_{m,x+T}$ may still be sparsified by using $\Psi_m$ based on the slow-varying characteristic of the downlink channel in time domain. Therefore, $h_{m,x+T}$ may be recovered based on $\Phi_m h_{m,x+T}$ by using the typical sparse signal reconstruction algorithm, for example, the OMP algorithm. Finally, a high-dimensional downlink channel matrix $H_{x+T}=[h_{1,x+T}, h_{2,x+T}, \ldots, h_{M,x+T}]$ may be obtained.

When the foregoing method in this application is implemented by using a compressed sensing technology, the first matrix to the fourth matrix may also be respectively referred to as a frequency-domain sensing matrix, a frequency-domain compression matrix, a space-domain sensing matrix, and a space-domain compression matrix. In addition, the access network device may further send indication information to the terminal, to indicate the terminal to estimate the downlink channel matrix by using a conventional method or by using the method provided in this application. The terminal may perform corresponding uplink feedback based on the indication information.

Figures 19, 20:
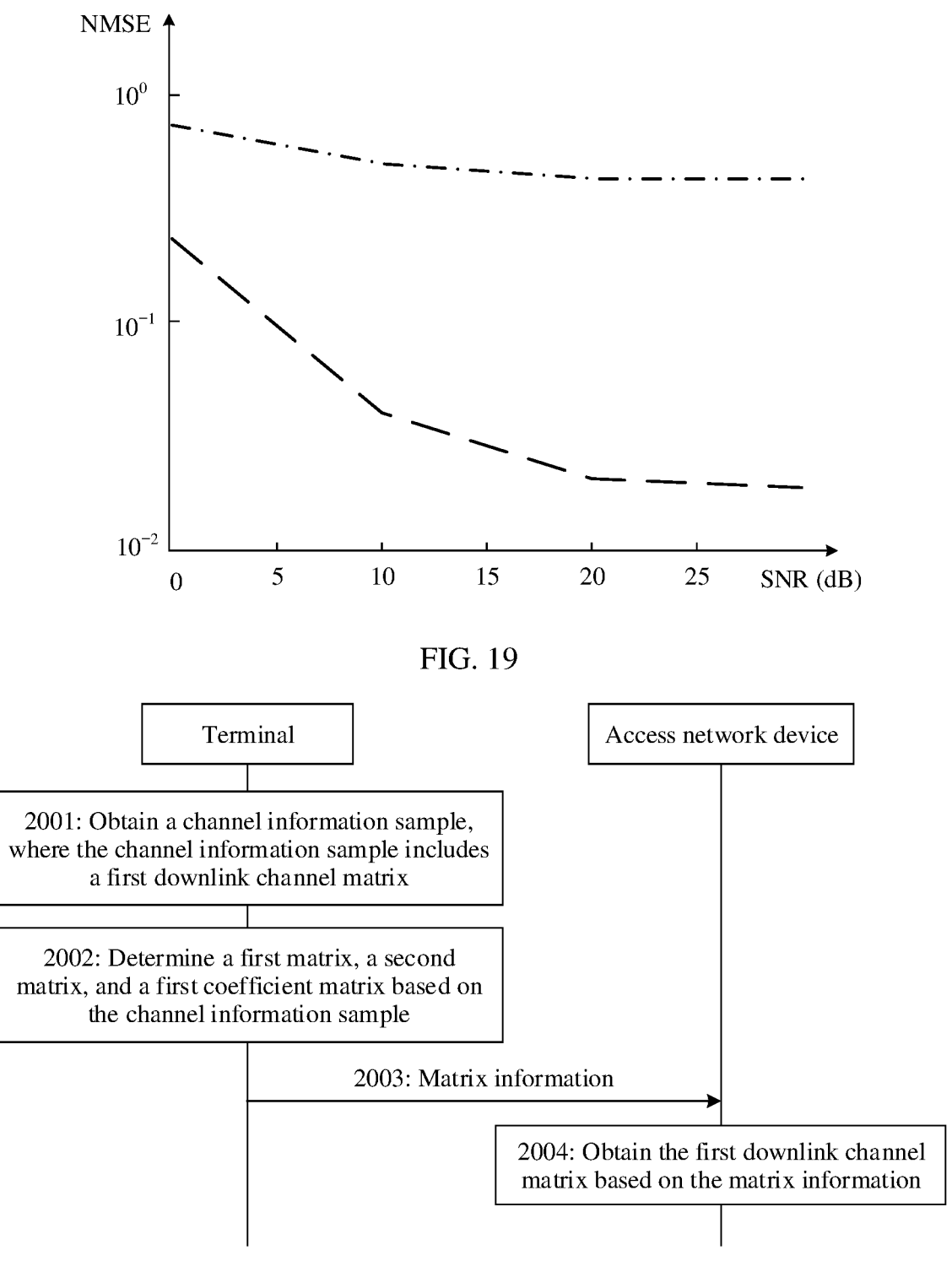
FIG. 19 is a schematic diagram of a simulation result according to an embodiment of this application.
FIG. 20 to FIG. 22 each are a flowchart of a signal sending method according to an embodiment of this application.

The scenario 2 is used as an example. When N=64, M=128, T=10, N'=4, and M'=24, if a cluster delay line-B (CDL-B) model is used as a channel model, as shown in FIG. 19, a normalized mean square error (NMSE) is used as a performance indicator, to obtain downlink channel matrices in 100 slots by using the method provided in this embodiment of this application. Under a same signal-to-noise ratio (SNR) (unit: dB), precision (shown by a dashed line) in the method provided in this embodiment of this application is higher than that in a conventional technology (shown by a dash-dot line). That is, on the premise of same measurement pilot overheads and same overheads for uplink feedback, the method provided in this embodiment of this application can significantly improve estimation accuracy. In other words, under same precision, the method provided in this embodiment of this application can significantly reduce overheads (including the measurement pilot overheads and the overheads for the uplink feedback) for obtaining the downlink channel matrix.

For the scenario 1, different frequency domain units do not need to be distinguished, and the access network device may calculate the first matrix by using Formula 1.3. A difference lies in that when Y is determined, $\Phi_D$ is not required, that is, $$Y = \begin{bmatrix} (h_{1,1})^H & (h_{1,2})^H & \ldots & (h_{1,T})^H \\ (h_{2,1})^H & (h_{2,2})^H & \ldots & (h_{2,T})^H \\ \vdots & \vdots & \ddots & \vdots \\ (h_{M,1})^H & (h_{M,2})^H & \ldots & (h_{M,T})^H \end{bmatrix}.$$

The access network device may calculate the second matrix by using Formula 1.4.

For the scenario 1, specific implementation of step 602 is similar to that of step 902, and specific implementation of step 605 is similar to that of step 905. Compared with step 906, step 606 includes no space-domain recovery during the specific implementation.

For the scenario 2, in another implementation, the access network device may alternatively first determine the first matrix and the second matrix, and then determine the third matrix and the fourth matrix based on the second matrix. Correspondingly, during recovery, the space-domain recovery may be first performed, and then the frequency-domain recovery is performed. In this case, different frequency domain units do not need to be distinguished, and the access network device may calculate the first matrix by using Formula 1.3. A difference lies in that when Y is determined, $\Phi_D$ is not required, that is, $$Y = \begin{bmatrix} (h_{1,1})^H & (h_{1,2})^H & \ldots & (h_{1,T})^H \\ (h_{2,1})^H & (h_{2,2})^H & \ldots & (h_{2,T})^H \\ \vdots & \vdots & \ddots & \vdots \\ (h_{M,1})^H & (h_{M,2})^H & \ldots & (h_{M,T})^H \end{bmatrix}.$$

The access network device may calculate the second matrix by using Formula 1.4. The access network device may determine the third matrix by using Formula 1.1. A difference lies in that $$H = \begin{bmatrix} h_{1,1}\Phi_f & h_{1,2}\Phi_f & \ldots & h_{1,T}\Phi_f \\ h_{2,1}\Phi_f & h_{2,2}\Phi_f & \ldots & h_{2,T}\Phi_f \\ \vdots & \vdots & \ddots & \vdots \\ h_{N,1}\Phi_f & h_{N,2}\Phi_f & \ldots & h_{N,T}\Phi_f \end{bmatrix},$$

where $h_{n,s}$ represents an $n^{th}$ row in $H_s$. The access network device may determine the fourth matrix by using Formula 1.2.

For the scenario 3, the methods for determining the third matrix and the fourth matrix in the case 1 are also applicable to the scenario 3. The methods for determining the third matrix and the fourth matrix, step (31), and step (32) in the case 2 are also applicable to the scenario 3. In addition, in the case 1 and the case 2, specific implementation of step 1104 is similar to that of step 905. Compared with step 906, step 1105 includes no frequency-domain recovery during the specific implementation.

A main idea of Embodiment 1 is as follows: The downlink channel matrix in the $(x+T)^{th}$ time unit is first more sparsified in the space domain and/or the frequency domain by using a sparse learning algorithm, to reduce the overheads required by the access network device to send the measurement pilots. Then, after measuring the measurement pilots, the terminal does not perform channel estimation, but directly feeds back, to the access network device, the feedback information indicating the information about the measurement pilot signal received by the terminal in the $(x+T)^{th}$ time unit. The access network device receives the feedback information that is sent by the terminal and that includes the measurement pilots carrying the channel information, and recovers the actual downlink channel matrix in the $(x+T)^{th}$ time unit through a small amount of measurement by using a compressed sensing algorithm.

Embodiment 2

During specific implementation, Embodiment 2 may include the following scenario 1 (where a terminal performs only one type of compression (for example, frequency-domain compression or space-domain compression) on an actually measured downlink channel matrix in one or more time units) and scenario 2 (where a terminal performs two types of compression (for example, frequency-domain compression and space-domain compression) on an actually measured downlink channel matrix in one or more time units). The signal sending method provided in Embodiment 2 is specifically described below in the two scenarios.

Scenario 1: The terminal performs only one type of compression (for example, the frequency-domain compression or the space-domain compression) on the actually measured downlink channel matrix in the one or more time units.

In the scenario 1 shown in FIG. 20, the signal sending method provided in Embodiment 2 includes the following steps.

2001: The terminal obtains a channel information sample, where the channel information sample includes a first downlink channel matrix.

Optionally, the first downlink channel matrix may be a downlink channel matrix, a covariance matrix of a downlink channel matrix, or a characteristic matrix of a downlink channel matrix.

For example, the channel information sample includes T first downlink channel matrices, and the T first downlink channel matrices are respectively first downlink channel matrices in an $x^{th}$ time unit to an $(x+T-1)^{th}$ time unit, where both x and T are integers greater than or equal to 1.

It should be noted that a plurality of time units corresponding to the T first downlink channel matrices may be consecutive or non-consecutive. This is not limited in this application. However, in this application, consecutive time units are used as an example to describe the method provided in this embodiment of this application. The channel information sample may alternatively include a first downlink channel matrix in another time unit instead of the first downlink channel matrices in the $x^{th}$ time unit to the $(x+T-1)^{th}$ time unit. This is not limited in this application.

If the first downlink channel matrices in T time units (namely, the $x^{th}$ time unit to the $(x+T-1)^{th}$ time unit) are respectively denoted as $H_1, H_2, \ldots, H_T$, for a process of determining each first downlink channel matrix, refer to the related descriptions in step 601.

A process in which the terminal obtains the channel information sample maybe referred to as initialization.

2002: The terminal determines a first matrix, a second matrix, and a first coefficient matrix based on the channel information sample.

In a first possible implementation, First coefficient matrix=First downlink channel matrix*Second matrix. First downlink channel matrix=Second coefficient matrix*First matrix, and a quantity of columns in the first coefficient matrix is less than a quantity of columns in the first downlink channel matrix. One second coefficient matrix corresponds to one first downlink channel matrix, and row vectors in the second coefficient matrix correspond one-to-one to row vectors in the corresponding first downlink channel matrix. A row vector in the second coefficient matrix is a sparse representation of a corresponding row vector in the corresponding first downlink channel matrix.

In a second possible implementation, First coefficient matrix=Second matrix*First downlink channel matrix. First downlink channel matrix=First matrix*Second coefficient matrix, and a quantity of rows in the first coefficient matrix is less than a quantity of rows in the first downlink channel matrix. One second coefficient matrix corresponds to one first downlink channel matrix, and column vectors in the second coefficient matrix correspond one-to-one to column vectors in the corresponding first downlink channel matrix. A column vector in the second coefficient matrix is a sparse representation of a corresponding column vector in the corresponding first downlink channel matrix.

During determining of the first coefficient matrix, the first matrix and the second coefficient matrix may be first determined based on the first downlink channel matrix, then the second matrix is determined based on the first matrix, and finally the first coefficient matrix is determined based on the second matrix and the first downlink channel matrix.

Optionally, the second coefficient matrix satisfies at least one of the following conditions:

(1) A quantity of non-zero elements in the second coefficient matrix is less than a quantity of non-zero elements in the first downlink channel matrix.

(2) When a ratio of a sum of power of P1 elements whose amplitudes are top in the first downlink channel matrix to power of the first downlink channel matrix is greater than a first threshold, and a ratio of a sum of power of P1-1 elements whose amplitudes are top in the first downlink channel matrix to the power of the first downlink channel matrix is less than the first threshold, a ratio of a sum of power of P2 elements whose amplitudes are top in the second coefficient matrix to power of the second coefficient matrix is greater than the first threshold, and a ratio of a sum of power of P2-1 elements whose amplitudes are top in the second coefficient matrix to the power of the second coefficient matrix is less than the first threshold, where P2<P1, both P1 and P2 are integers greater than or equal to 1, and the first threshold is an integer greater than 0 and less than or equal to 1.

When the second coefficient matrix satisfies at least one of the conditions (1) and (2), it indicates that the second coefficient matrix is a sparse representation of the first downlink channel matrix.

The first threshold may be preset, predefined, specified in a protocol, or determined by an access network device and the terminal through negotiation. This is not limited in this application. For example, the first threshold may be 95%, 90%, 85%, or 80%.

2003: The terminal reports matrix information to the access network device. Correspondingly, the access network device receives the matrix information from the terminal. The matrix information includes related information of the first coefficient matrix, the first matrix, and the second matrix. Alternatively, the matrix information includes related information of the first coefficient matrix and a tenth matrix, where the tenth matrix is determined based on the first matrix and the second matrix.

For example, the tenth matrix may be a product of the first matrix and the second matrix.

Related information of a matrix may be the matrix, or may be an amplitude or a phase of each element in the matrix, a location of the matrix in a candidate matrix set, or the like.

2004: The access network device obtains the first downlink channel matrix based on the matrix information.

In the method shown in FIG. 20, the terminal may compress (perform frequency-domain compression or space-domain compression on) the first downlink channel matrix, to reduce overheads for uplink feedback.

Optionally, the first matrix and/or the second matrix satisfy/satisfies at least one of the following conditions:

(1) An amplitude of at least one element in the first matrix and/or the second matrix is different from an amplitude of at least one other element.

(2) At least one row or at least one column in the first matrix and/or the second matrix is a non-geometric progression.

Optionally, a report periodicity of the first coefficient matrix is less than report periodicities of both the first matrix and the second matrix, or a report periodicity of the first coefficient matrix is less than a report periodicity of the tenth matrix.

It should be noted that the terminal may periodically update the matrices, may update the matrices when channel quality is poor, or may update the matrices in another case. This is not limited in this application.

Scenario 2: The terminal performs two types of compression (for example, the frequency-domain compression and the space-domain compression) on the actually measured downlink channel matrix in the one or more time units.

Figures 21, 22:
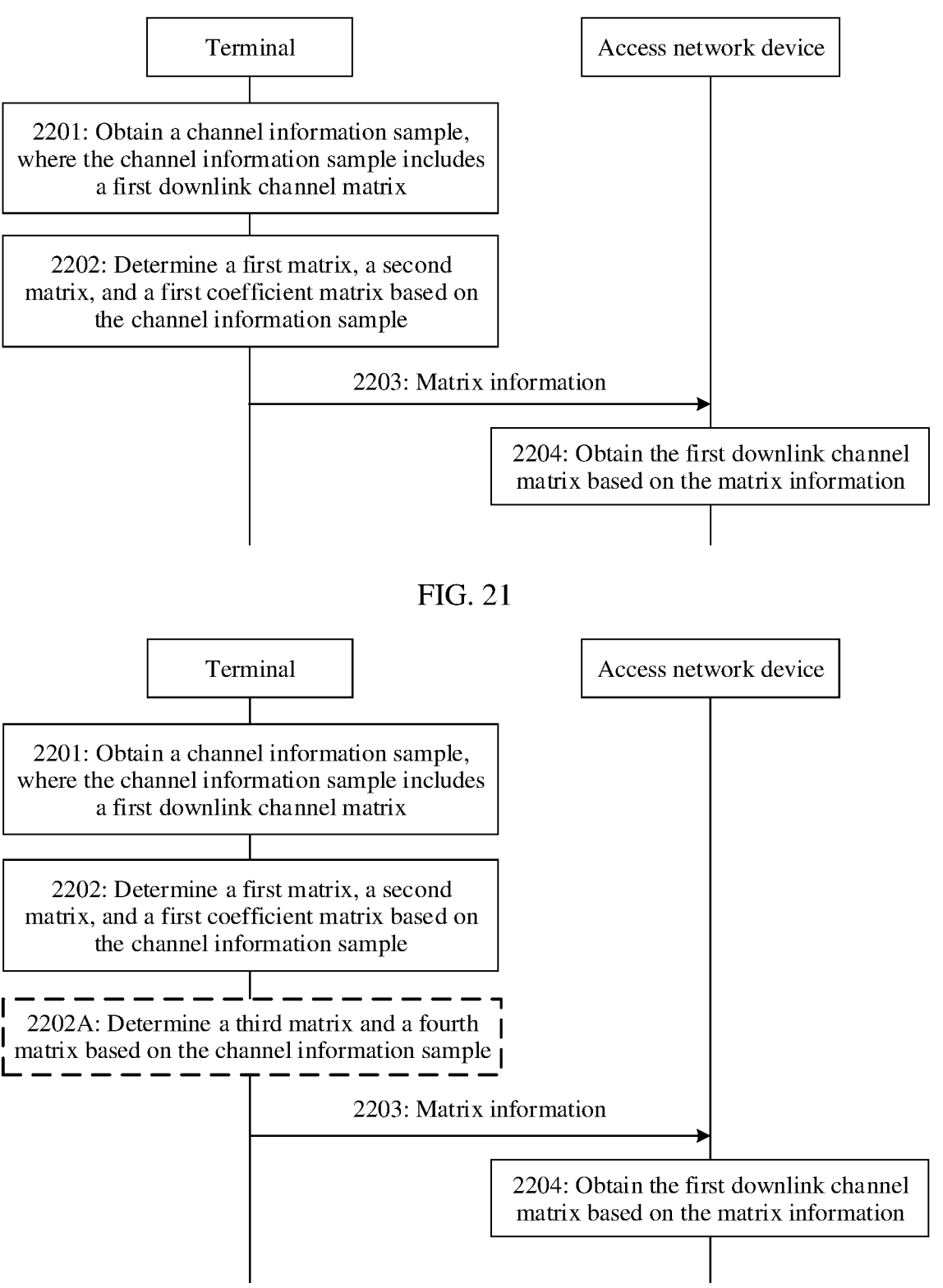

In the scenario 2, as shown in FIG. 21, the method further includes the following steps.

2201: The terminal obtains a channel information sample, where the channel information sample includes a first downlink channel matrix.

For descriptions related to step 2201, refer to step 2001.

2202: The terminal determines a first matrix, a second matrix, and a first coefficient matrix based on the channel information sample.

In a first possible implementation, First coefficient matrix=Second downlink channel matrix*Second matrix, where the second downlink channel matrix is determined by using the first downlink channel matrix. Second downlink channel matrix=Third coefficient matrix*First matrix, and a quantity of columns in the first coefficient matrix is less than a quantity of columns in the second downlink channel matrix. One third coefficient matrix corresponds to one second downlink channel matrix, and row vectors in the third coefficient matrix correspond one-to-one to row vectors in the corresponding second downlink channel matrix. A row vector in the third coefficient matrix is a sparse representation of a corresponding row vector in the corresponding second downlink channel matrix.

In a second possible implementation, First coefficient matrix=Second matrix*Second downlink channel matrix, where the second downlink channel matrix is determined by using the first downlink channel matrix. Second downlink channel matrix=First matrix*Third coefficient matrix, and a quantity of rows in the first coefficient matrix is less than a quantity of rows in the second downlink channel matrix. One third coefficient matrix corresponds to one second downlink channel matrix, and column vectors in the third coefficient matrix correspond one-to-one to column vectors in the corresponding second downlink channel matrix. A column vector in the third coefficient matrix is a sparse representation of a corresponding column vector in the corresponding second downlink channel matrix.

Optionally, the third coefficient matrix satisfies at least one of the following conditions:

(1) A quantity of non-zero elements in the third coefficient matrix is less than a quantity of non-zero elements in the second downlink channel matrix.

(2) When a ratio of a sum of power of P3 elements whose amplitudes are top in the second downlink channel matrix to power of the second downlink channel matrix is greater than a second threshold, and a ratio of a sum of power of P3-1 elements whose amplitudes are top in the second downlink channel matrix to the power of the second downlink channel matrix is less than the second threshold, a ratio of a sum of power of P4 elements whose amplitudes are top in the third coefficient matrix to power of the third coefficient matrix is greater than the second threshold, and a ratio of a sum of power of P4-1 elements whose amplitudes are top in the third coefficient matrix to the power of the third coefficient matrix is less than the second threshold, where P4<P3, both P3 and P4 are integers greater than or equal to 1, and the second threshold is an integer greater than 0 and less than or equal to 1.

When the third coefficient matrix satisfies at least one of the conditions (1) and (2), it indicates that the third coefficient matrix is a sparse representation of the second downlink channel matrix.

The second threshold may be preset, predefined, specified in a protocol, or determined by an access network device and the terminal through negotiation. This is not limited in this application. For example, the second threshold may be 95%, 90%, 85%, or 80%.

During determining of the first coefficient matrix, the first matrix and the third coefficient matrix may be first determined based on the second downlink channel matrix, then the second matrix is determined based on the first matrix, and finally the first coefficient matrix is determined based on the second matrix and the second downlink channel matrix.

2203: The terminal reports matrix information to the access network device. Correspondingly, the access network device receives the matrix information from the terminal.

The matrix information includes related information of the first coefficient matrix, the first matrix, and the second matrix. Alternatively, the matrix information includes related information of the first coefficient matrix and a tenth matrix, where the tenth matrix is determined based on the first matrix and the second matrix. The access network device obtains the first downlink channel matrix based on the matrix information.

2204: The access network device obtains the first downlink channel matrix based on the matrix information.

In the method shown in FIG. 21, the terminal may compress the second downlink channel matrix. Because the second downlink channel matrix is determined based on the first downlink channel matrix, the terminal may compress the first downlink channel matrix, to reduce overheads for uplink feedback.

Optionally, the first matrix and/or the second matrix satisfy/satisfies at least one of the following conditions:

(1) An amplitude of at least one element in the first matrix and/or the second matrix is different from an amplitude of at least one other element.

(2) At least one row or at least one column in the first matrix and/or the second matrix is a non-geometric progression.

Optionally, a report periodicity of the first coefficient matrix is less than report periodicities of both the first matrix and the second matrix, or a report periodicity of the first coefficient matrix is less than a report periodicity of the tenth matrix.

As shown in FIG. 22, optionally, the matrix information further includes related information of a third matrix and a fourth matrix, or the matrix information further includes related information of an eleventh matrix, where the eleventh matrix is determined based on the third matrix and the fourth matrix. The method further includes the following step:

2202A: The terminal determines the third matrix and the fourth matrix based on the channel information sample. Second downlink channel matrix=Fourth matrix*First downlink channel matrix, First downlink channel matrix=Third matrix*Fourth coefficient matrix, and a quantity of rows in the second downlink channel matrix is less than a quantity of rows in the first downlink channel matrix.

In this case, the terminal may determine the first matrix based on the channel information sample and the fourth matrix.

For example, the eleventh matrix may be a product of the third matrix and the fourth matrix.

Optionally, the fourth coefficient matrix satisfies at least one of the following conditions:

(1) A quantity of non-zero elements in the fourth coefficient matrix is less than a quantity of non-zero elements in the first downlink channel matrix.

(2) When a ratio of a sum of power of P5 elements whose amplitudes are top in the first downlink channel matrix to power of the first downlink channel matrix is greater than a third threshold, and a ratio of a sum of power of P5-1 elements whose amplitudes are top in the first downlink channel matrix to the power of the first downlink channel matrix is less than the third threshold, a ratio of a sum of power of P6 elements whose amplitudes are top in the fourth coefficient matrix to power of the fourth coefficient matrix is greater than the third threshold, and a ratio of a sum of power of P6-1 elements whose amplitudes are top in the fourth coefficient matrix to the power of the fourth coefficient matrix is less than the third threshold, where P6<P5, both P5 and P6 are integers greater than or equal to 1, and the third threshold is an integer greater than 0 and less than or equal to 1.

When the fourth coefficient matrix satisfies at least one of the conditions (1) and (2), it indicates that the fourth coefficient matrix is a sparse representation of the first downlink channel matrix.

The third threshold may be preset, predefined, specified in a protocol, or determined by the access network device and the terminal through negotiation. This is not limited in this application. For example, the third threshold may be 95%, 90%, 85%, or 80%.

Optionally, the third matrix and/or the fourth matrix satisfy/satisfies at least one of the following conditions:

(1) An amplitude of at least one element in the third matrix and/or the fourth matrix is different from an amplitude of at least one other element.

(2) At least one row or at least one column in the third matrix and/or the fourth matrix is a non-geometric progression.

Optionally, a report periodicity of the first coefficient matrix is less than report periodicities of all the first matrix, the second matrix, the third matrix, and the fourth matrix, or a report periodicity of the first coefficient matrix is less than report periodicities of both the tenth matrix and the eleventh matrix.

It should be noted that the terminal may periodically update the matrices, may update the matrices when channel quality is poor, or may update the matrices in another case. This is not limited in this application.

Similar to Embodiment 1, for ease of description, the following uses an example in which the channel information sample includes T N*M first downlink channel matrices (where T, N, and M are all integers greater than or equal to 1) to describe a method for determining each matrix in the foregoing methods. Specifically, a case 1 (where each matrix is determined for all frequency domain units in a time unit) and a case 2 (where each matrix is separately determined for each frequency domain unit in a time unit) are used as examples for description.

Case 1: Each matrix is determined for all the frequency domain units in the time unit.

In the case 1, optionally, the third matrix satisfies a condition: An F-norm of a matrix difference between a product of the third matrix and a fifth matrix and a sixth matrix is the smallest.

The sixth matrix is an N*(M*T) matrix, column vectors in the sixth matrix include all column vectors in the T first downlink channel matrices, column vectors in the fifth matrix include all column vectors in T fourth coefficient matrices, a column vector in the fifth matrix is a sparse representation of a corresponding column vector in the sixth matrix, and a quantity of non-zero elements in each column vector in the fifth matrix is equal to $S_1$, where $S_1$ is an integer greater than or equal to 1 and less than N.

In the case 1, optionally, the fourth matrix satisfies a condition: Column coherence of a matrix (which may be denoted as a seventh matrix) obtained by multiplying the fourth matrix by the third matrix is the smallest.

In the case 1, optionally, the first matrix satisfies a condition: An F-norm of a matrix difference between a product of the first matrix and an eighth matrix and a conjugate transposition matrix of a ninth matrix is the smallest.

The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the fourth matrix, and the $s^{th}$ first downlink channel matrix is an $s^{th}$ first downlink channel matrix in the T first downlink channel matrices, where m is an integer greater than or equal to 1 and less than or equal to M, and s is an integer greater than or equal to 1 and less than or equal to T.

Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

An $m^{th}$ column vector in the eighth matrix may include T column vectors arranged in a top-to-bottom sequence, an $s^{th}$ column vector in the T column vectors is an $m^{th}$ column in an $s^{th}$ third coefficient matrix, and the $s^{th}$ third coefficient matrix is a third coefficient matrix corresponding to an $(x+s-1)^{th}$ time unit.

In the case 1, optionally, the second matrix satisfies a condition: Column coherence of a matrix obtained by multiplying the second matrix by the first matrix is the smallest.

For specific implementation of methods for determining the third matrix, the fourth matrix, and the first matrix in the case 1 in Embodiment 2, refer to the case 1 in Embodiment 1. A difference between the method for determining the second matrix in the case 1 in Embodiment 2 and the method for determining the second matrix in the case 1 in Embodiment 1 lies in: In Embodiment 2, the fourth matrix may not be a row-extracted matrix.

Case 2: Each matrix is separately determined for each frequency domain unit in the time unit.

In the case 2, optionally, the third matrix includes M third submatrices, and an $m^{th}$ third submatrix in the M third submatrices satisfies a condition: An F-norm of a matrix difference between a product of the $m^{th}$ third submatrix and an $m^{th}$ fifth submatrix and an $m^{th}$ sixth submatrix is the smallest, where m is an integer greater than or equal to 1 and less than or equal to M.

The $m^{th}$ sixth submatrix is an N*T matrix, column vectors in the $m^{th}$ sixth submatrix include $m^{th}$ column vectors in the T first downlink channel matrices, column vectors in the $m^{th}$ fifth submatrix include $m^{th}$ column vectors in T fourth coefficient matrices, a column vector in the $m^{th}$ fifth submatrix is a sparse representation of a corresponding column vector in the $m^{th}$ sixth submatrix, and a quantity of non-zero elements in each column vector in the $m^{th}$ fifth submatrix is equal to $S_1$, where $S_1$ is an integer greater than or equal to 1 and less than N.

In the case 2, optionally, the fourth matrix includes M fourth submatrices, and an $m^{th}$ fourth submatrix in the M fourth submatrices satisfies a condition: Column coherence of an $m^{th}$ seventh submatrix obtained by multiplying the $m^{th}$ fourth submatrix by the $m^{th}$ third submatrix is the smallest.

In the case 2, optionally, the first matrix satisfies a condition: An F-norm of a matrix difference between a product of the first matrix and an eighth matrix and a conjugate transposition matrix of a ninth matrix is the smallest.

The ninth matrix is determined based on the channel information sample and the fourth matrix, an $m^{th}$ column vector in the ninth matrix includes T column vectors arranged in a top-to-bottom sequence, an $s^{th}$ column vector in the T column vectors is a product of an $m^{th}$ column in an $s^{th}$ first downlink channel matrix and the $m^{th}$ fourth submatrix, and the $s^{th}$ first downlink channel matrix is an $s^{th}$ first downlink channel matrix in the T first downlink channel matrices, where s is an integer greater than or equal to 1 and less than or equal to T.

Column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, where $S_2$ is an integer greater than or equal to 1 and less than M.

An $m^{th}$ column vector in the eighth matrix includes T column vectors arranged in a top-to-bottom sequence, an $s^{th}$ column vector in the T column vectors is an $m^{th}$ column in an $s^{th}$ third coefficient matrix, and the $s^{th}$ third coefficient matrix is a third coefficient matrix corresponding to an $(x+s-1)^{th}$ time unit.

In the case 2, optionally, the second matrix satisfies a condition: Column coherence of a matrix obtained by multiplying the second matrix by the first matrix is the smallest.

For specific implementation of methods for determining the third matrix, the fourth matrix, and the first matrix in the case 2 in Embodiment 2, refer to the case 2 in Embodiment 1. A method for determining the second matrix in the case 2 in Embodiment 2 is the same as that in the case 1 in Embodiment 2. For details, refer to the foregoing descriptions.

Optionally, in a case, T indicates a total quantity of time units included in the channel information sample, N indicates a product of a quantity of ports for sending one or more measurement pilots and a quantity of ports used by the terminal to receive a measurement pilot signal that are configured by the access network device, and M indicates a quantity of frequency domain units for sending the one or more measurement pilots that is configured by the access network device. In this case, the terminal performs first space-domain compression and then frequency-domain compression on the first downlink channel matrix. In another case, N indicates a quantity of frequency domain units for sending one or more measurement pilots that is configured by the access network device, and M indicates a product of a quantity of ports for sending the one or more measurement pilots and a quantity of ports used by the terminal to receive a measurement pilot signal that are configured by the access network device. In this case, the terminal performs first frequency-domain compression and then space-domain compression on the first downlink channel matrix.

For the case 1 and the case 2, when recovering the T first downlink channel matrices, the access network device may separately recover the first downlink channel matrices. A recovery method is similar to that in Embodiment 1. For details, refer to the foregoing descriptions.

For the scenario 1, if the terminal performs only space-domain compression on the first downlink channel matrix, in the case 1, the first matrix and the second matrix may be respectively calculated by using Formula 1.1 and Formula 1.2, where $\Psi_D$ is the first matrix, and $\Phi_D$ is the second matrix; in the case 2, the first matrix and the second matrix may be respectively calculated by using Formula 2.1 and Formula 2.2, where $\Psi_m$ is an $m^{th}$ first submatrix in the first matrix, and $\Phi_m$ is an $m^{th}$ second submatrix in the second matrix.

For the scenario 1, if the terminal performs only frequency-domain compression on the first downlink channel matrix, different frequency domain units do not need to be distinguished, and the terminal may calculate the first matrix by using Formula 1.3. A difference lies in that when Y is determined, $\Phi_D$ is not required, that is, $$Y = \begin{bmatrix} (h_{1,1})^H & (h_{1,2})^H & \dots & (h_{1,T})^H \\ (h_{2,1})^H & (h_{2,2})^H & \dots & (h_{2,T})^H \\ \vdots & \vdots & \ddots & \vdots \\ (h_{M,1})^H & (h_{M,2})^H & \dots & (h_{M,T})^H \end{bmatrix}.$$

The terminal may calculate the second matrix by using Formula 1.4.

For the scenario 2, when the terminal performs first frequency-domain compression and then space-domain compression on the first downlink channel matrix, different frequency domain units do not need to be distinguished. The terminal may calculate the third matrix by using Formula 1.3. A difference lies in that when Y is determined, $\Phi_D$ is not required, that is, $$Y = \begin{bmatrix} (h_{1,1})^H & (h_{1,2})^H & \dots & (h_{1,T})^H \\ (h_{2,1})^H & (h_{2,2})^H & \dots & (h_{2,T})^H \\ \vdots & \vdots & \ddots & \vdots \\ (h_{M,1})^H & (h_{M,2})^H & \dots & (h_{M,T})^H \end{bmatrix}.$$

In this case, $\Psi_f$ is the third matrix. The terminal may calculate the fourth matrix by using Formula 1.4. In this case, $\Phi_f$ is the fourth matrix. The terminal may calculate the first matrix by using Formula 1.1. A difference lies in that $$\tilde{H} = \begin{bmatrix} h_{1,1}\Phi_f & h_{1,2}\Phi_f & \dots & h_{1,T}\Phi_f \\ h_{2,1}\Phi_f & h_{2,2}\Phi_f & \dots & h_{2,T}\Phi_f \\ \vdots & \vdots & \ddots & \vdots \\ h_{N,1}\Phi_f & h_{N,2}\Phi_f & \dots & h_{N,T}\Phi_f \end{bmatrix},$$

where $h_{n,s}$ represents an $n^{th}$ row in $H_s$. In this case, $\Psi_D$ is the first matrix. The terminal may calculate the second matrix by using Formula 1.2. In this case, $\Phi_D$ is the second matrix.

When the foregoing method in this application is implemented by using a compressed sensing technology, if the terminal performs first space-domain compression and then frequency-domain compression on the first downlink channel matrix, the first matrix to the fourth matrix may also be respectively referred to as a frequency-domain sensing matrix, a frequency-domain compression matrix, a space-domain sensing matrix, and a space-domain compression matrix. In addition, the access network device may further send indication information to the terminal, to indicate the terminal to perform uplink feedback by using a conventional method or by using the method provided in this application. The terminal may perform corresponding uplink feedback based on the indication information.

In the method provided in Embodiment 2, because the terminal does not use first downlink channel matrix information in a historical time unit when determining each matrix, a more accurate first downlink channel matrix may be obtained by using the method provided in Embodiment 2. In addition, compared with a process in a conventional technology, the process of compressing the first downlink channel matrix provided in this embodiment of this application may more sparsify the first downlink channel matrix. Therefore, the terminal feeds back less information to the access network device, so that the overheads for the uplink feedback are fewer than those in the conventional technology.

Based on Embodiment 1 and Embodiment 2, in another embodiment, that "the F-norm is the smallest" may be replaced with that "the F-norm is less than or equal to a threshold" or that "the F-norm is within a numerical range". The threshold and the numerical range may be preset, predefined, specified in a protocol, or determined by the access network device and the terminal through negotiation. This is not limited in this application.

The signal sending methods provided in the foregoing embodiments of this application may be further applied to massive MIMO uplink channel estimation to reduce sounding reference signal (SRS) overheads, may be further applied to uplink/downlink data channel estimation to reduce demodulation reference signal (DMRS) overheads, and may be further applied to a scenario of estimating a channel phase deviation caused by a crystal oscillator, to reduce phase tracking reference signal (PT-RS) overheads. Implementation principles are similar.

The foregoing mainly describes the solutions in embodiments of this application from the perspective of interaction between network elements. It may be understood that, to implement the foregoing functions, the network elements such as the access network device and the terminal include corresponding hardware structures and/or software modules for performing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the access network device and the terminal may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in embodiments of this application, division into the units is an example, and is merely logical function division. During actual implementation, another division manner may be used.

Figure 23:
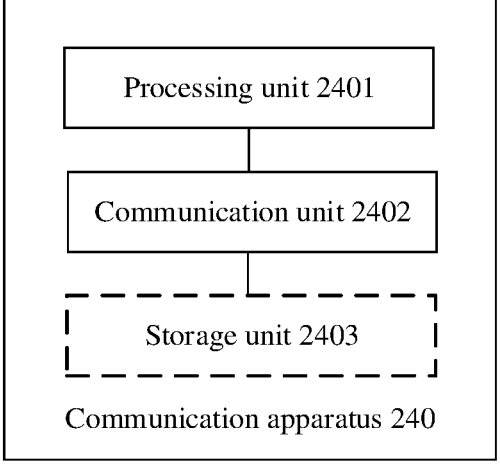
FIG. 23 is a schematic composition diagram of a communication apparatus according to an embodiment of this application.

When an integrated unit is used, FIG. 23 shows a communication apparatus 240 in the foregoing embodiments. The communication apparatus 240 may include a processing unit 2401 and a communication unit 2402. Optionally, the communication apparatus 240 further includes a storage unit 2403. The schematic diagram of the structure shown in FIG. 23 may be used to illustrate structures of a signal sending apparatus and a channel matrix obtaining apparatus in the foregoing embodiments, and may be specifically used to illustrate structures of the access network device and the terminal.

When the schematic diagram of the structure shown in FIG. 23 is used to illustrate the structure of the access network device in the foregoing embodiments, the processing unit 2401 is configured to control and manage actions of the access network device. For example, the processing unit 2401 is configured to support the access network device to perform steps 601 to 603 in FIG. 6, 601, 602, 602A, 603, and

605 to 607 in FIG. 8, 901 to 903 in FIG. 9, 901, 902, 902A, 902B, 903, and 905 to 907 in FIG. 10, 1101 and 1102 in FIG. 11, 1101, 1101A, 1102, and 1104 to 1106 in FIG. 12, 2003 and 2004 in FIG. 20, 2203 and 2204 in FIG. 21, 2203 and 2204 in FIG. 22, and/or an action performed by the access network device in another process described in embodiments of this application. The processing unit 2401 may communicate with another network entity through the communication unit 2402, for example, communicate with a terminal shown in FIG. 6. The storage unit 2403 is configured to store program code and data of the access network device.

When the schematic diagram of the structure shown in FIG. 23 is used to illustrate the structure of the access network device in the foregoing embodiments, the communication apparatus 240 may be a device, or may be a chip in the device.

When the schematic diagram of the structure shown in FIG. 23 is used to illustrate the structure of the terminal in the foregoing embodiments, the processing unit 2401 is configured to control and manage actions of the terminal. For example, the processing unit 2401 is configured to support the terminal to perform steps 603 in FIG. 6, 602A and 603 to 605 in FIG. 8, 903 in FIG. 9, 902A, 902B, and 903 to 905 in FIG. 10, 1102 in FIG. 11, 1101A and 1102 to 1104 in FIG. 12, 2001 to 2003 in FIG. 20, 2201 to 2203 in FIG. 21, 2201, 2202, 2202A, and 2203 in FIG. 22, and/or an action performed by the terminal in another process described in embodiments of this application. The processing unit 2401 may communicate with another network entity through the communication unit 2402, for example, communicate with an access network device shown in FIG. 6. The storage unit 2403 is configured to store program code and data of the terminal.

When the schematic diagram of the structure shown in FIG. 23 is used to illustrate the structure of the terminal in the foregoing embodiments, the communication apparatus 240 may be a device, or may be a chip in the device.

When the integrated unit in FIG. 23 is implemented in a form of a software functional module and sold or used as an independent product, the integrated unit may be stored in a computer-readable storage medium. Based on such an understanding, the technical solutions of embodiments of this application essentially, the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

The unit in FIG. 23 may also be referred to as a module. For example, the processing unit may be referred to as a processing module.

Figure 24:
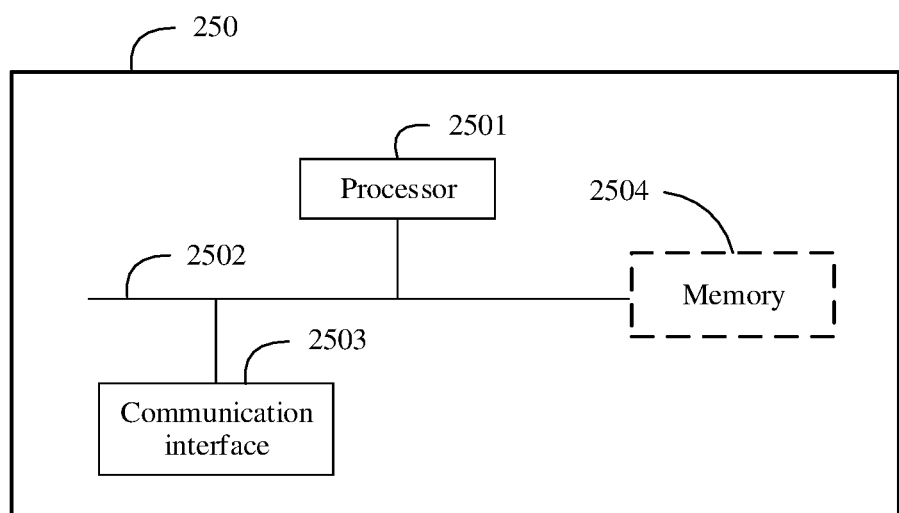
FIG. 24 is a schematic diagram of a hardware structure of a communication apparatus according to an embodiment of this application.

FIG. 24 is a schematic diagram of a hardware structure of a communication apparatus 250 according to an embodiment of this application. The communication apparatus 250 includes one or more processors 2501 and a communication interface 2503.

Optionally, the communication apparatus 250 further includes a memory 2504, and the memory 2504 is coupled to the processor 2501. The memory 2504 may include a ROM and a RAM, and provide operation instructions and data to the processor 2501. A part of the memory 2504 may further include a non-volatile random access memory (NVRAM).

In this embodiment of this application, the communication apparatus 250 invokes the operation instructions (where the operation instructions may be stored in an operating system) stored in the memory 2504, to perform a corresponding operation.

The processor 2501 may also be referred to as a central processing unit (CPU).

The processor 2501, the communication interface 2503, and the memory 2504 are coupled together through a communication bus 2502. The communication bus 2502 may further include a power bus, a control bus, a status signal bus, and the like in addition to a data bus. However, for clarity of description, various buses are marked as the communication bus 2502 in FIG. 24.

The methods disclosed in the foregoing embodiments of this application may be applied to the processor 2501, or may be implemented by the processor 2501. The processor 2501 may be an integrated circuit chip, and has a signal processing capability. In an implementation process, the steps in the foregoing methods may be implemented by using a hardware integrated logic circuit in the processor 2501 or by using instructions in a software form. The processor 2501 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in a decoding processor and a software module. The software module may be located in a mature storage medium in the art, such as a RAM, a flash memory, a ROM, a programmable read-only memory, an electrically erasable programmable memory, or a register. The storage medium is located in the memory 2504, and the processor 2501 reads information in the memory 2504 and completes the steps in the foregoing methods in combination with hardware of the processor 2501.

For example, the schematic diagram of the structure shown in FIG. 24 may be used to illustrate structures of a signal sending apparatus and a channel matrix obtaining apparatus in the foregoing embodiments, and may be specifically used to illustrate structures of the access network device and the terminal.

When the schematic diagram of the structure shown in FIG. 24 is used to illustrate the structure of the access network device in the foregoing embodiments, the processor 2501 is configured to control and manage actions of the access network device. For example, the processor 2501 is configured to support the access network device to perform steps 601 to 603 in FIG. 6, 601, 602, 602A, 603, and 605 to 607 in FIG. 8, 901 to 903 in FIG. 9, 901, 902, 902A, 902B, 903, and 905 to 907 in FIG. 10, 1101 and 1102 in FIG. 11, 1101, 1101A, 1102, and 1104 to 1106 in FIG. 12, 2003 and 2004 in FIG. 20, 2203 and 2204 in FIG. 21, 2203 and 2204 in FIG. 22, and/or an action performed by the access network device in another process described in embodiments of this application. The processor 2501 may communicate with another network entity through the communication interface 2503, for example, communicate with a terminal shown in FIG. 6. The memory 2504 is configured to store program code and data of the access network device.

When the schematic diagram of the structure shown in FIG. 24 is used to illustrate the structure of the terminal in the foregoing embodiments, the processor 2501 is configured to control and manage actions of the terminal. For example, the processor 2501 is configured to support the terminal to perform step 603 in FIG. 6, 602A and 603 to 605 in FIG. 8, 903 in FIG. 9, 902A, 902B, and 903 to 905 in FIG. 10, 1102 in FIG. 11, 1101A and 1102 to 1104 in FIG. 12, 2001 to 2003 in FIG. 20, 2201 to 2203 in FIG. 21, 2201, 2202, 2202A, and 2203 in FIG. 22, and/or an action performed by the terminal in another process described in embodiments of this application. The processor 2501 may communicate with another network entity through the communication interface 2503, for example, communicate with an access network device shown in FIG. 6. The memory 2504 is configured to store program code and data of the terminal.

The foregoing communication unit or communication interface may be an interface circuit or a communication interface of the apparatus, and is configured to receive a signal from another apparatus. For example, when the apparatus is implemented as a chip, the communication unit or communication interface is an interface circuit or a communication interface that is of the chip and that is configured to receive a signal from or send a signal to another chip or apparatus.

In the foregoing embodiments, the instructions stored in the memory that are to be executed by the processor may be implemented in a form of a computer program product. The computer program product may be written into the memory in advance, or may be downloaded and installed in the memory in a software form.

The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Optionally, an embodiment of this application further provides a computer-readable storage medium. The computer-readable storage medium stores computer instructions. When the computer-readable storage medium is run on a computer, the computer is enabled to perform the communication methods provided in embodiments of this application.

An embodiment of this application further provides a computer program product that includes computer instructions. When the computer program product runs on a computer, the computer is enabled to perform the methods provided in embodiments of this application.

An embodiment of this application further provides a chip. The chip includes a processor and an interface. The processor is coupled to a memory through the interface. When the processor executes a computer program or instructions in the memory, the methods provided in embodiments of this application are performed.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

Although this application is described with reference to embodiments herein, in a process of implementing this application that claims protection, a person skilled in the art may understand and implement another variation of disclosed embodiments by viewing the accompanying drawings, disclosed content, and appended claims. In the claims, "comprising" does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and embodiments thereof, it is clear that various modifications and combinations may be made to them without departing from the scope of this application. Correspondingly, this specification and the accompanying drawings are merely example descriptions of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of the claims of this application and their equivalent technologies.

What is claimed is:

1. A signal sending method, comprising:

obtaining a channel information sample, wherein the channel information sample comprises channel information in an $x^{th}$ time unit to an $(x+T-1)^{th}$ time unit, and both x and T are integers greater than or equal to 1;

determining M' frequency domain units in M frequency domain units in an $(x+T)^{th}$ time unit based on the channel information sample, wherein the M' frequency domain units are used to send one or more measurement pilots for measuring channel state information (CSI), both M' and M are integers greater than or equal to 1, and M'<M; and sending the one or more measurement pilots to a terminal in the M' frequency domain units, wherein the one or more measurement pilots sent in each of the M' frequency domain units are precoded by using a fourth matrix, the fourth matrix being configured to perform space-domain dimension reduction on the one or more measurement pilots, wherein a seventh matrix is obtained by multiplying the fourth matrix by a third matrix, the third matrix being configured to sparsely represent channel information, and column coherence of the seventh matrix is the smallest.

2. The method according to claim 1, further comprising:

sending first indication information to the terminal, wherein the first indication information indicates location information of the M' frequency domain units.

3. The method according to claim 1, wherein the sending the one or more measurement pilots to a terminal in the M' frequency domain units comprises:

sending one or more measurement pilots of N' ports to the terminal in each of the M' frequency domain units based on the channel information sample, and sending second indication information to the terminal, wherein the second indication information indicates a value of N', and N' is an integer greater than or equal to 1.

4. The method according to claim 1, further comprising:

receiving feedback information from the terminal, wherein the feedback information indicates information about a measurement pilot signal received by the terminal in the $(x+T)^{th}$ time unit; and determining a downlink channel matrix in the $(x+T)^{th}$ time unit based on the feedback information.

5. The method according to claim 1, further comprising:

calculating a downlink channel matrix in an $(x+T+1)^{th}$ time unit by using channel information in p time units as a channel information sample, wherein p is an integer greater than or equal to 1 and less than or equal to x+T.

6. The method according to claim 1, wherein a downlink channel matrix in a time unit indicates channel information in the time unit, and the downlink channel matrix in each time unit is an N*M matrix, wherein N is an integer greater than or equal to 1; and an F-norm of a matrix difference between a product of the third matrix and a fifth matrix and a sixth matrix is the smallest, wherein the sixth matrix is an N* (M*T) matrix, column vectors in the sixth matrix comprise all column vectors in downlink channel matrices in the $x^{th}$ time unit to the $(x+T-1)^{th}$ time unit, column vectors in the fifth matrix correspond one-to-one to the column vectors in the sixth matrix, a column vector in the fifth matrix is a sparse representation of a corresponding column vector in the sixth matrix, and a quantity of non-zero elements in each column vector in the fifth matrix is equal to $S_1$, wherein $S_1$ is an integer greater than or equal to 1 and less than N.

7. The method according to claim 1, wherein the M' frequency domain units are determined by using a second matrix, column coherence of a matrix obtained by multiplying the second matrix by a first matrix is the smallest; and the second matrix is a row-extracted matrix, each row in the second matrix has only one non-zero element, and non-zero elements in different rows are in different locations;

an F-norm of a matrix difference between a product of the first matrix and an eighth matrix and a conjugate transposition matrix of a ninth matrix is the smallest, wherein the ninth matrix is determined based on the channel information sample and the fourth matrix, an $m^{th}$ column vector in the ninth matrix comprises T column vectors arranged in a top-to-bottom sequence, an $s^{th}$ column vector in the T column vectors is a product of an $m^{th}$ column in an $s^{th}$ downlink channel matrix and the fourth matrix, and the $s^{th}$ downlink channel matrix is a downlink channel matrix in an $(x+s-1)^{th}$ time unit in the $x^{th}$ time unit to the $(x+T-1)^{th}$ time unit, wherein m is an integer greater than or equal to 1 and less than or equal to M, and s is an integer greater than or equal to 1 and less than or equal to T; and column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, wherein $S_2$ is an integer greater than or equal to 1 and less than M.

8. A signal sending method, comprising:

receiving a measurement pilot signal;

determining feedback information, wherein the feedback information indicates information about the measurement pilot signal, the measurement pilot signal comprises N'*M'*R elements, each element represents the measurement pilot signal received on one of N' ports for sending one or more measurement pilots, in one of M' frequency domain units for sending the one or more measurement pilots, and on one of R ports for receiving the measurement pilot signal, and R, N', and M' are all integers greater than or equal to 1; and sending the feedback information to an access network device, wherein the M' frequency domain units are determined from M frequency domain units in an $(x+T)^{th}$ time unit based on a channel information sample and by using a second matrix, the channel information sample comprises channel information in an $x^{th}$ time unit to the $(x+T-1)^{th}$ time unit, both x and T are integers greater than or equal to 1, M is a positive integer, M'<M, and column coherence of a matrix obtained by multiplying the second matrix by a first matrix is the smallest, the first matrix being determined based on the channel information sample.

9. The method according to claim 8, wherein the measurement pilot signal comprises a plurality of groups of elements, each group of elements comprises more than one element, and the feedback information indicates amplitude information and phase information of each group of elements.

10. The method according to claim 8, further comprising:

receiving first indication information and second indication information from the access network device, wherein the first indication information indicates location information of the M' frequency domain units for sending the one or more measurement pilots, and the second indication information indicates a value of N'; and the receiving a measurement pilot signal comprises:

receiving the measurement pilot signal on N' ports in each of the M' frequency domain units.

11. A signal sending apparatus, comprising:

at least one processor; and a memory storing programming instructions that, when executed by the at least one processor, cause the signal sending apparatus to perform operations comprising:

obtaining a channel information sample, wherein the channel information sample comprises channel information in an $x^{th}$ time unit to an $(x+T-1)^{th}$ time unit, and both x and T are integers greater than or equal to 1;

determining M' frequency domain units in M frequency domain units in an $(x+T)^{th}$ time unit based on the channel information sample, wherein the M' frequency domain units are used to send one or more measurement pilots for measuring channel state information (CSI), both M' and M are integers greater than or equal to 1, and M'<M; and sending the one or more measurement pilots to a terminal in the M' frequency domain units, wherein the one or more measurement pilots sent in each of the M' frequency domain units are precoded by using a fourth matrix, the fourth matrix being configured to perform space-domain dimension reduction on the one or more measurement pilots, wherein a seventh matrix is a matrix obtained by multiplying the fourth matrix by a third matrix, the third matrix being configured to sparsely represent channel information, and column coherence of the seventh matrix is the smallest.

12. The apparatus according to claim 11, wherein the operations further comprise:

sending first indication information to the terminal, wherein the first indication information indicates location information of the M' frequency domain units.

13. The apparatus according to claim 11, wherein the sending the one or more measurement pilots to a terminal in the M' frequency domain units comprises:

sending one or more measurement pilots of N' ports to the terminal in each of the M' frequency domain units based on the channel information sample, and sending second indication information to the terminal, wherein the second indication information indicates a value of N', and N' is an integer greater than or equal to 1.

14. The apparatus according to claim 11, wherein the operations further comprise:

receiving feedback information from the terminal, wherein the feedback information indicates information about a measurement pilot signal received by the terminal in the $(x+T)^{th}$ time unit; and determining a downlink channel matrix in the $(x+T)^{th}$ time unit based on the feedback information.

15. The apparatus according to claim 11, wherein the operations further comprise:

calculating a downlink channel matrix in an $(x+T+1)^{th}$ time unit by using channel information in p time units as a channel information sample, wherein p is an integer greater than or equal to 1 and less than or equal to x+T.

16. The apparatus according to claim 11, wherein a downlink channel matrix in a time unit indicates channel information in the time unit, and the downlink channel matrix in each time unit is an N*M matrix, wherein N is an integer greater than or equal to 1; and an F-norm of a matrix difference between a product of the third matrix and a fifth matrix and a sixth matrix is the smallest, wherein the sixth matrix is an N* (M*T) matrix, column vectors in the sixth matrix comprise all column vectors in downlink channel matrices in the $x^{th}$ time unit to the $(x+T-1)^{th}$ time unit, column vectors in the fifth matrix correspond one-to-one to the column vectors in the sixth matrix, a column vector in the fifth matrix is a sparse representation of a corresponding column vector in the sixth matrix, and a quantity of non-zero elements in each column vector in the fifth matrix is equal to $S_1$, wherein $S_1$ is an integer greater than or equal to 1 and less than N.

17. The apparatus according to claim 11, wherein the M' frequency domain units are determined by using a second matrix, column coherence of a matrix obtained by multiplying the second matrix by a first matrix is the smallest; and the second matrix is a row-extracted matrix, each row in the second matrix has only one non-zero element, and non-zero elements in different rows are in different locations;

an F-norm of a matrix difference between a product of the first matrix and an eighth matrix and a conjugate transposition matrix of a ninth matrix is the smallest, wherein the ninth matrix is determined based on the channel information sample and the fourth matrix, an $m^{th}$ column vector in the ninth matrix comprises T column vectors arranged in a top-to-bottom sequence, an $s^{th}$ column vector in the T column vectors is a product of an $m^{th}$ column in an $s^{th}$ downlink channel matrix and the fourth matrix, and the $s^{th}$ downlink channel matrix is a downlink channel matrix in an $(x+s-1)^{th}$ time unit in the $x^{th}$ time unit to the $(x+T-1)^{th}$ time unit, wherein m is an integer greater than or equal to 1 and less than or equal to M, and s is an integer greater than or equal to 1 and less than or equal to T; and column vectors in the eighth matrix correspond one-to-one to column vectors in the conjugate transposition matrix of the ninth matrix, a column vector in the eighth matrix is a sparse representation of a corresponding column vector in the conjugate transposition matrix of the ninth matrix, and a quantity of non-zero elements in each column vector in the eighth matrix is equal to $S_2$, wherein $S_2$ is an integer greater than or equal to 1 and less than M.

18. A signal sending apparatus, comprising:

at least one processor; and a memory storing programming instructions that, when executed by the at least one processor, cause the signal sending apparatus to perform operations comprising:

receiving a measurement pilot signal;

determining feedback information, wherein the feedback information indicates information about the measurement pilot signal, the measurement pilot signal comprises N'*M'*R elements, each element represents the measurement pilot signal received on one of N' ports for sending one or more measurement pilots, in one of M' frequency domain units for sending the one or more measurement pilots, and on one of R ports for receiving the measurement pilot signal, and R, N', and M' are all integers greater than or equal to 1; and sending the feedback information to an access network device, wherein the M' frequency domain units are determined from M frequency domain units in an $(x+T)^{th}$ time unit based on a channel information sample and by using a second matrix, the channel information sample comprises channel information in an $x^{th}$ time unit to the $(x+T-1)^{th}$ time unit, both x and T are integers greater than or equal to 1, M is a positive integer, M'<M, and column coherence of a matrix obtained by multiplying the second matrix by a first matrix is the smallest, the first matrix being determined based on the channel information sample.

19. The apparatus according to claim 18, wherein the measurement pilot signal comprises a plurality of groups of elements, each group of elements comprises more than one element, and the feedback information indicates amplitude information and phase information of each group of elements.

20. The apparatus according to claim 18, wherein the operations further comprise:

receiving first indication information and second indication information from the access network device, wherein the first indication information indicates location information of the M' frequency domain units for sending the one or more measurement pilots, and the second indication information indicates a value of N'; and the receiving a measurement pilot signal comprises: receiving the measurement pilot signal on N' ports in each of the M' frequency domain units.

* * * * *